United States Patent [19]
Mukawa

[11] Patent Number: 5,862,120
[45] Date of Patent: Jan. 19, 1999

[54] DISC TABLE FOR DISC RECORDING/ REPRODUCING APPARATUS AND METHOD FOR PRODUCING SAME

[75] Inventor: Hiroshi Mukawa, Tokyo, Japan

[73] Assignee: Sony Corporation, Japan

[21] Appl. No.: 962,325

[22] Filed: Oct. 31, 1997

Related U.S. Application Data

[62] Division of Ser. No. 730,935, Oct. 16, 1996, which is a continuation of Ser. No. 391,461, Feb. 21, 1995, Pat. No. 5,633,856, which is a continuation of Ser. No. 5,159, Jan. 15, 1993, abandoned.

[30] Foreign Application Priority Data

| Jan. 24, 1992 | [JP] | Japan | 4-032932 |
| May 26, 1992 | [JP] | Japan | 4-157300 |
| Sep. 30, 1992 | [JP] | Japan | 4-285218 |

[51] Int. Cl.$^6$ ............................ G11B 17/03; G11B 25/04
[52] U.S. Cl. ........................................ 369/270; 360/99.12
[58] Field of Search .................................... 369/270, 271, 369/289, 290, 264, 282; 360/99.05, 99.12

[56] References Cited

U.S. PATENT DOCUMENTS

| 4,387,454 | 6/1983 | Yamamura et al. | 369/270 |
| 4,390,979 | 6/1983 | Saito et al. | 369/270 |
| 4,484,321 | 11/1984 | Eisemann | 369/270 |
| 4,562,570 | 12/1985 | Denton | 369/270 |
| 4,730,300 | 3/1988 | Kamoshita et al. | 369/270 |
| 4,754,350 | 6/1988 | Ota | 369/270 |
| 4,786,997 | 11/1988 | Funabashi et al. | 369/270 |
| 4,791,624 | 12/1988 | Stinesen | 369/270 |
| 4,951,277 | 8/1990 | Masunaga et al. | 369/270 |
| 5,166,920 | 11/1992 | Kogure | 369/270 |
| 5,631,894 | 5/1997 | Takahashi | 369/270 |

FOREIGN PATENT DOCUMENTS 4-305858  10/1992  Japan .

*Primary Examiner*—David L. Ometz
*Attorney, Agent, or Firm*—Ronald P. Kananen

[57] ABSTRACT

A disc table employed in a disc recording/reproducing apparatus has, as a recording medium, a recording disc, such as an optical disc or a magneto-optical disc, on which information signals are pre-recorded or are to be recorded. The disc table includes a fitting member fitted from its distal end into a circular center aperture of the recording disc, a table section which is integrated to the fitting member at a proximal side of the fitting member and on which a rim portion around the center aperture of the disc is set, a thrusting and supporting unit for thrusting and supporting the recording disc with respect to the table section, and a centering unit provided at a proximal side of the fitting member and adapted for thrusting the rim portion around the center aperture of the recording disc for aligning the center of rotation of the recording disc with the center of rotation of the fitting member. The fitting member is gradually tapered towards its distal end where the fitting member is provided with a guide slidingly contacted with the inner rim of the center aperture of the recording disc for guiding the recording disc towards the center of rotation of the fitting member. The recording disc may be positively centered to enable stable rotation of the recording disc while realizing a simplified thin type construction.

7 Claims, 19 Drawing Sheets

DISC TABLE FOR DISC RECORDING/REPRODUCING APPARATUS AND METHOD FOR PRODUCING SAME

This application is a divisional of application Ser. No. 08/730,935 filed Oct. 16, 1996, which is a continuation of Ser. No. 08/391,461 filed Feb. 21, 1995, now U.S. Pat. No. 5,633,856 which is a continuation of Ser. No. 08/005,159 filed Jan. 15, 1993, abandoned.

BACKGROUND OF THE INVENTION

1. Field of the Invention

This invention relates to a disc table employed in a disc recording/reproducing apparatus for a recording disc, such as an optical disc or a magneto-optical disc, on which information signals are to be recorded or pre-recorded. More particularly, the present invention relates to such disc table having a centering member enabling the recording medium to be loaded and centered with respect to the disc table. The present invention also relates to a method for producing the disc table.

2. Description of the Related Art

Recently, recording discs such as optical discs or magneto-optical discs, and a recording/reproducing apparatus employing such recording discs as a recording medium, have been proposed.

In the above-described recording/reproducing apparatus, when recording information signals on the recording disc or reproducing information signals recorded on the recording disc, the disc is rotated with a pickup unit which acts as a recording and/or reproducing means for the information signals facing a signal recording surface of the disc. To this end, there is provided in the disc recording/reproducing apparatus a disc rotating and driving mechanism having a disc table on which the recording disc is loaded and which is adapted to be rotated in unison with the disc. As such disc table employed in the disc rotating and driving mechanism, there is known a disc table disclosed in, for example, U.S. Pat. No. 4,068,851 to Yamamura and U.S. Pat. No. 4,340,955 to Elliott et al.

The disc table constituting the above-described disc rotating and driving mechanism comprises a table section integrated with a driving shaft of a rotating driving motor which function as a rotating and driving means, and a fitting member mounted at the middle of the table section which engages a center aperture of the recording disc set on the table section.

The disc table includes a thrusting and supporting mechanism for thrusting and supporting the recording disc set on the table section and insert in a predetermined position. The thrusting and supporting mechanism comprises a chucking plate mounted facing the table section and adapted to clamp the rim of the center aperture of the recording disc set on the table section in position on the table section.

The fitting member is substantially frusto-conical, with tapered towards its upper or distal end.

The fitting member is supported for movement along the axis of the driving shaft, while being resiliently biased by a biasing member, such as a spring, towards its upper end.

With the above-described disc table, in which the outer periphery of the fitting member is tapered and upwardly biased, when the recording disc is set on the table section, with the rim of the center aperture thereof in sliding contact with the outer periphery of the fitting member, the rim of the center aperture is thrust by the outer periphery of the fitting member to effect centering of the recording disc with respect to the driving shaft.

When the driving motor is driven for rotating the driving shaft, the recording disc is rotated in unison with the disc table.

Meanwhile, the above-described disc table in which the fitting member for centering the recording disc with respect to the disc table is supported for movement relative to the table section is complex in construction and difficult to assemble and manufacture. Besides, with this disc table, since it is necessary to provide the spring between the fitting member and the table section, it is difficult to achieve reduction in height of the table section.

To overcome this drawback, a disc table has been proposed in which the fitting member is fixedly provided with respect to the table section to achieve a simplified construction and a reduction in the height of the apparatus. However, it is necessary with this disc table design that the fitting member be smaller in size with respect to the center aperture in order to allow for the dimensional error of the outer diameter of the fitting member and the dimensional error of the inside diameter of the center aperture. Consequently, with such disc table, a very small clearance tends to be occur between the outer periphery of the fitting member and annual inner rim of the center aperture when the recording disc is set on the table section.

If such clearance is produced between the fitting member and the center aperture, not only can the centering of the recording disc with respect to the driving shaft not be achieved, but also the recording disc tends to shift relative to the table section in response to external vibrations or shock.

Further, with the above-described recording/reproducing apparatus, if the offset of the recording disc with respect to the driving shaft of the disc rotating and driving mechanism is sufficiently large, the light beam from the pickup unit for writing and/or reading information signals on or from the recording disc cannot follow the recording track of the recording disc and renders it impossible to record and/or reproduce the information signals. Additionally, with such disc recording/reproducing apparatus, if the recording disc shifts with respect to the table section in the course of recording and/or reproduction of the information signals, the light beam undergoes track jump to interrupt recording/reproduction process.

OBJECTS AND SUMMARY OF THE INVENTION

It is an object of the present invention to provide a disc table whereby a recording disc may be loaded on the disc table with a high centering accuracy with respect to the center of rotation of a disc rotating and driving mechanism.

It is another object of the present invention to provide a disc table whereby the effects of extraneous vibrations or shock on the loaded recording disc may be inhibited and thus ensure stable rotation of the recording disc.

It is a further object of the present invention to provide a disc table which is simplified in construction and reduced in height and which contributes to reduction in the thickness of the recording/reproducing apparatus.

It is yet another object of the present invention is to provide a method for producing a disc table whereby a disc table capable of achieving the above objects may be produced easily.

The present invention provides a disc table for a disc recording/reproducing apparatus employing a recording disc, such as an optical disc or a magneto-optical disc, on which information signals are pre-recorded or are to be recorded, as a recording medium. The disc table includes a fitting member fitted from its distal end into a circular center aperture of the recording disc, a table section which is integrated to the fitting member at a proximal side of the fitting member and on which a rim around the center aperture of the disc is set, a thrusting supporting unit for thrusting and supporting the recording disc with respect to the table section, and a centering unit provided at a proximal side of the fitting member and adapted for thrusting the rim around the center aperture of the recording disc for coinciding the center of rotation of the recording disc with the center of rotation of the fitting member. The fitting member is gradually tapered towards its distal end where the fitting member is provided with a guide slidingly contacted with the inner rim of the center aperture of the recording disc for guiding the recording disc towards the center of rotation of the fitting member. The recording disc may be positively centered to enable stable rotation of the recording disc while realizing a simplified thin type construction.

As means for thrusting and supporting the recording disc placed on the table section with respect to the table section, a magnet for attracting a magnetic metal plate mounted at the center of the recording disc is employed.

The proximal side of the fitting member fitted in the center aperture of the recording disc is formed as a columnar section having an outside diameter corresponding to the diameter of the center aperture of the recording disc.

The centering members are formed as plural spring plates mounted on the fitting member for being projected out of or receded inwardly of the outer peripheral surface of the proximal end of the fitting member.

The plural spring plates of the centering members are arranged on the fitting member in a state in which the spring plates are resiliently biased towards the center of the fitting member and which is controlled by resetting controlling means provided at the mid part of the table section.

The centering members are constituted by spring plates formed of a metallic material.

When the centering members are formed as spring plates of metallic material, both lateral sides of the portions of the centering members abutted against the inner rim of the center inn of the recording disc are bent substantially arcuately towards the center of the fitting member.

The present invention also provides a method for producing a disc table comprising positioning a fitting member by fitting a reference shaft of a positioning jig in a center aperture of said fitting member, placing centering means having plural centering members in the form of spring plates thrusting the inner rim of the center inn of the recording disc so that the centering members are positioned at the peripheral side of the fitting member, abutting each of the centering members with a substantially equal thrusting force on an abutment inner wall section of a positioning hole formed in a positioning jig with said reference shaft as a center for positioning said centering means with respect to said fitting member, and immobilizing and attaching said centering means in position with respect to said fitting member.

With the above-described disc table, the fitting member having a gradually tapered distal end and provided with a disc-capturing guide section at the distal end is intruded from the tapered distal end first into the circular center aperture of the recording disc and moved towards the proximal end of the fitting member so as to be guided towards the center region by the disc-capturing guide section. The disc is thrust and supported by thrusting supporting means with respect to the table section provided at the proximal end of the fitting member and has the inner rim of the center aperture thereof thrust by the centering means provided at the proximal end of the fitting member for effecting centering with respect to the disc table.

When a magnet attracting a metallic plate fitted at the center of the recording disc is employed as the thrusting supporting means for the recording disc, the recording disc is held only at one of its sides.

When the proximal side of the fitting member is designed as a columnar section, the recording disc when placed on the table section has its center aperture in intimate abutment contact with the proximal side of the fitting member to inhibit movement of the recording disc with respect to the table section.

When the centering means is constituted by centering members in the form of plural spring plates, arranged for being protruded from or receded inwardly of the outer periphery of the fitting member, the centering members may be integrated with the fitting member to simplify the construction of the disc table.

When the centering members in the form of spring plates are provided in the fitting member in a state in which they are resiliently biased towards the center of the fitting member and which is controlled by a controlling section provided at the center of the table section a sufficient thrusting force is applied to the recording disc by the centering members even although the centering members are of a lower spring constant. Besides, the fluctuations in the thrusting force applied to the recording disc as a result of errors in the spring constant may also be diminished.

When the centering members of the disc table are formed as spring plates of a metallic material, the centering members exhibit superior durability even under hostile environment such as elevated temperatures, while satisfactory characteristics with only small error rate may be achieved even although the spring constant of the centering members is increased.

When both lateral sides of the portions of the centering members formed as spring plates of a metallic material abutted against the inner rim of the center aperture of the recording disc are bent substantially arcuately towards the center of the fitting member, the recording disc is not injured by the centering members during disc loading and unloading and may be smoothly loaded or unloaded on the disc table.

The method for producing the disc table according to the present invention comprises positioning a fitting member to be intruded from its distal end first into the circular center opening of the recording disc by fitting a reference shaft of a positioning jig in a center aperture of the fitting member, placing the centering means so that its centering members in the form of plural spring plates thrusting the inner rim of the center aperture of the recording disc are positioned at the peripheral side of the fitting member, abutting each of the centering members with a substantially equal thrusting force on an abutment inner wall section of a positioning hole formed in the positioning jig coaxially with the reference shaft for positioning the centering means with respect to the fitting member, and immobilizing and attaching the centering means in position with respect to the fitting member, so that the centering means may be mounted at a position such that the inner rim of the center aperture of the recording disc may be uniformly thrust by the respective centering members.

Other objects and advantages of the present invention will become clear from the following description of the preferred embodiments and the claims.

DETAILED DESCRIPTION OF THE PREFERRED EMBODIMENTS

Figure 1:
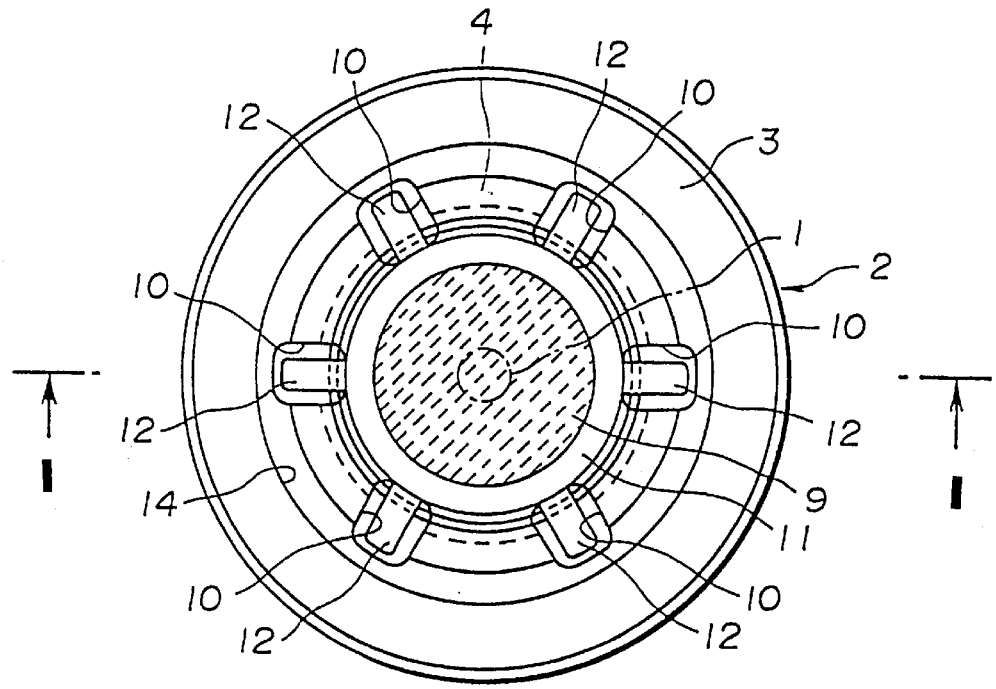
FIG. 1 is a plan view showing an arrangement of a disc table according to the present invention.

Referring to the drawings, illustrative embodiments of the present invention will be explained in detail.

Figure 2:
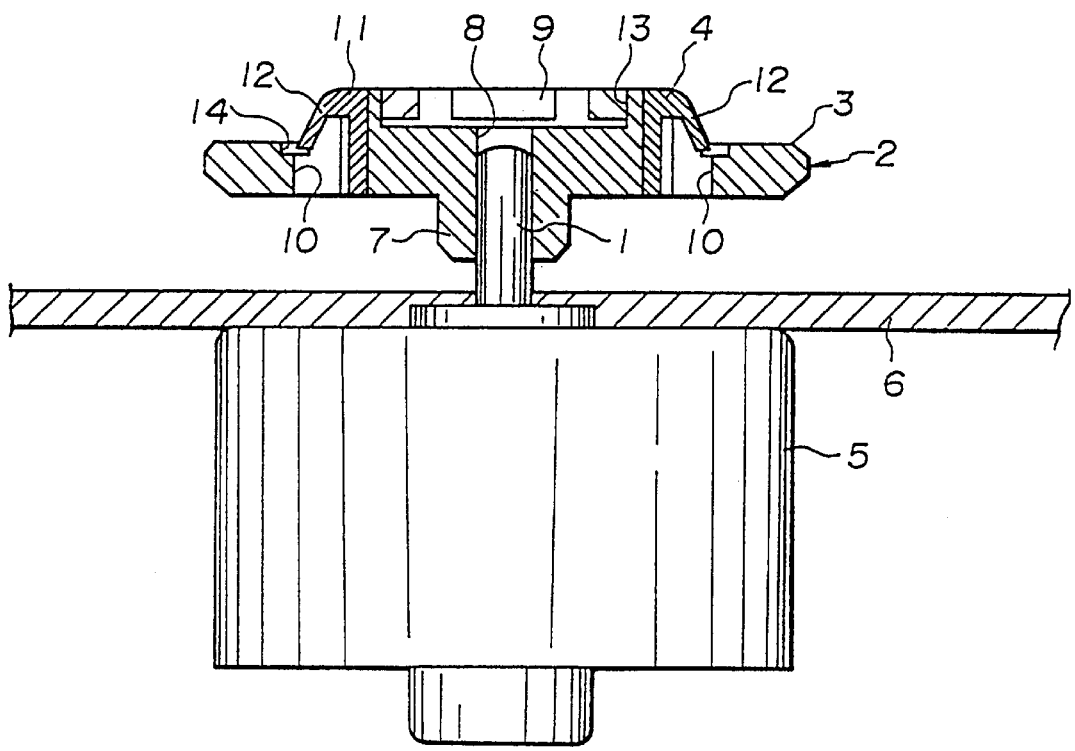
FIG. 2 is a longitudinal sectional view showing the arrangement of the disc table shown in FIG. 1.
Figure 3:
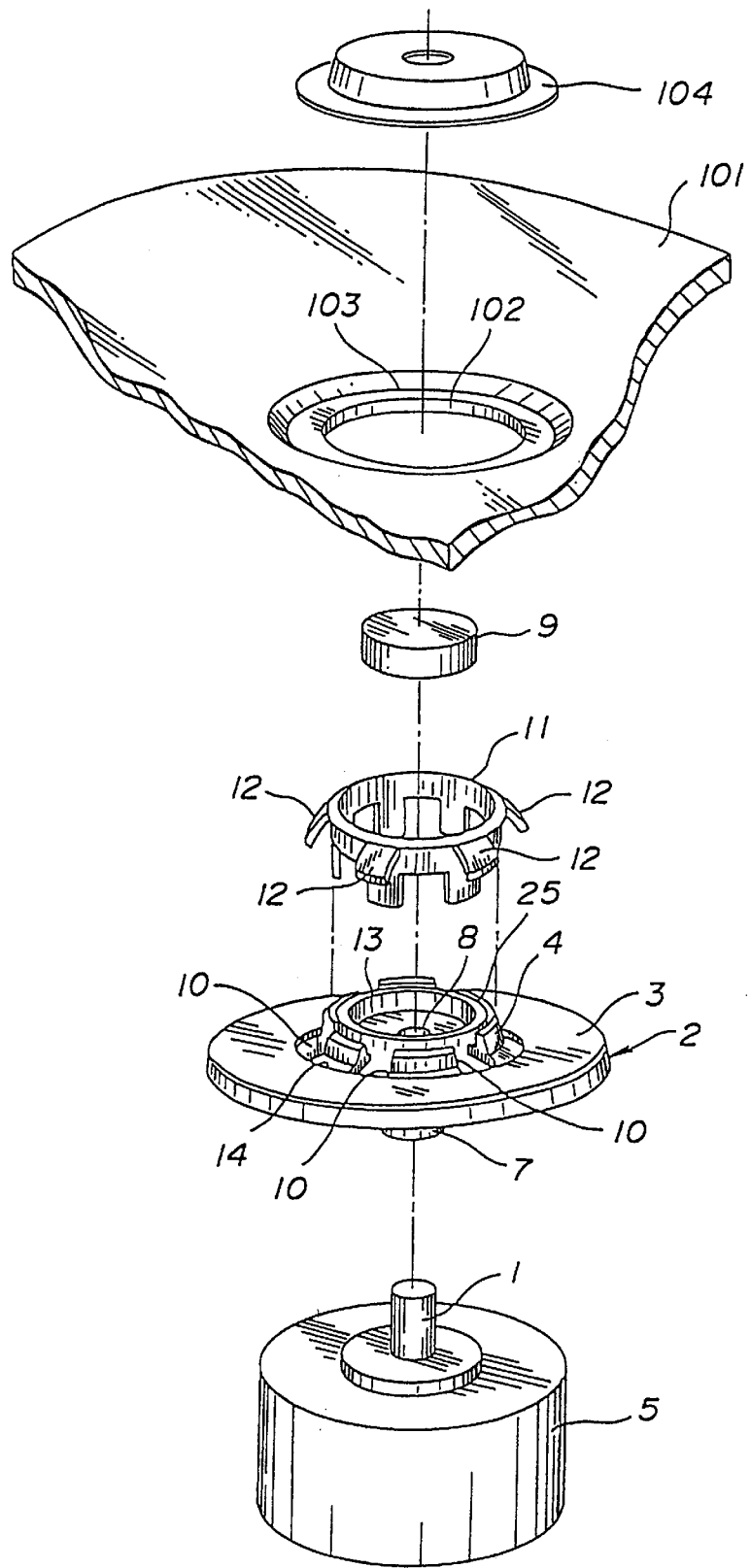
FIG. 3 is an exploded perspective view showing the arrangement of the disc table shown in FIG. 1.

Referring to FIGS. 1 to 3, showing a first embodiment of the disc table of the present invention, the disc table has a table section 2 fitted on a driving shaft 1 of a spindle motor 5 of a disc recording/reproducing apparatus in which the disc table is fitted. The table section 2 is formed substantially as a disc from synthetic resin or the like material and has an engaging aperture which is a center aperture engaged by the driving shaft 1. An outer peripheral region of an upper surface of the table section 2 is a disc setting surface 3 on which the recording disc 101 as a recording medium is set.

On the lower surface of the table section 2, there is formed a cylindrical supporting section 7, centered about the engaging aperture 8. The function of the supporting section 7 is to increase the length of the engaging aperture 8 so as to be larger than the thickness of the table section 2 for assuring more positive support of the table section 2 by the driving shaft 1.

Figure 4:
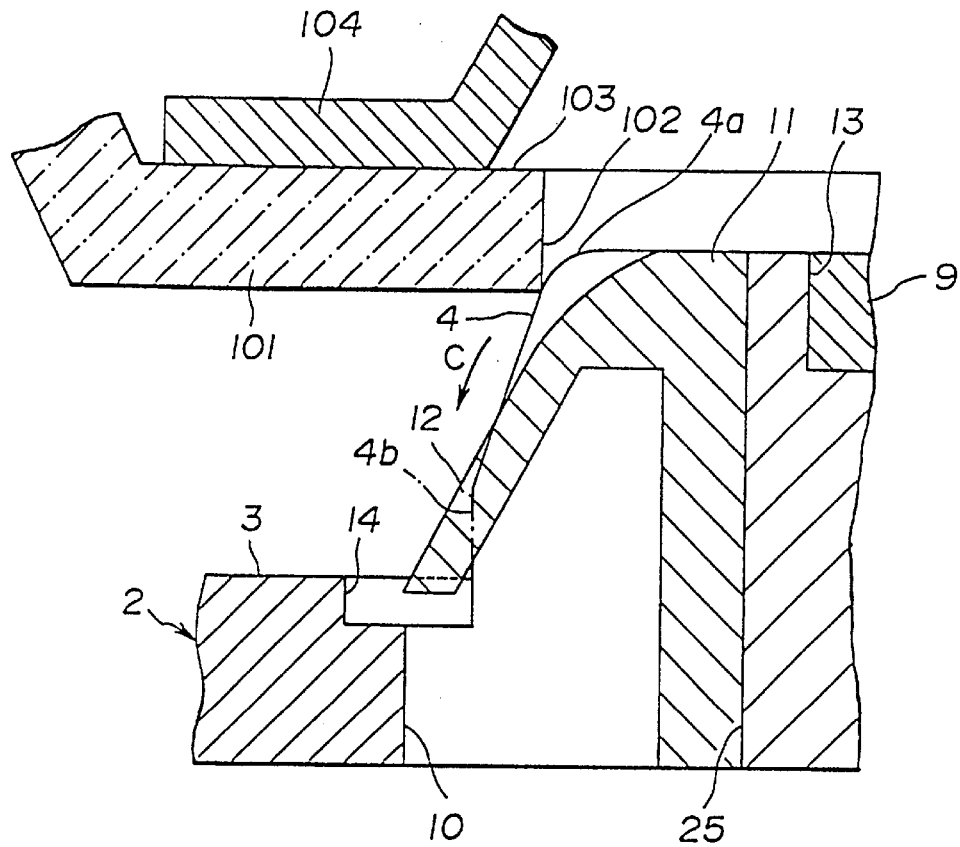
FIG. 4 is an enlarged longitudinal cross-sectional view showing essential portions of the disc table shown in FIG. 1.

The recording disc 101 loaded on the disc table comprises a disc-shaped disc substrate 101a formed of a light-transmitting transparent synthetic resin and a signal recording layer formed on one of the major surfaces of the disc substrate 101a, as shown in FIGS. 3 and 4. The disc substrate 101a has a circular center aperture 102. This circular aperture serves as a reference for the loading position of the disc on the disc table provided within the disc recording/reproducing apparatus.

On the opposite major surface of the disc substrate 101a is formed an annular rib surrounding the center aperture 102. On the major surface of the disc substrate carrying the signal recording surface is formed an annular recess 103 surrounding the center aperture 102 in register with the annular rib, as shown in FIG. 3. A substantially disc-shaped magnetic plate 104, formed of a magnetic material, such as metal, is set within the recess 103. The magnetic plate 104 is retained by the disc substrate 101a by means of an adhesive or supporting lugs formed by thermally deforming part of the disc substrate 101a formed e.g. of synthetic resin.

The signal recording layer, deposited on the firstly-mentioned major surface of the disc substrate 101a, is formed of a metallic material for providing a perpendicular recording magnetic film and a reflective layer for reflecting the light beam, and is used for recording desired information signals.

The spindle motor 5 is mounted on the lower surface of a chassis 6 of the disc recording/reproducing apparatus, and has its driving shaft 1 extended above the chassis 6 via a through-hole in the chassis 6, as shown in FIG. 2. Above the chassis 6, an optical pickup device and a magnetic head device, not shown, for recording and/or reproducing information signals with respect to the signal recording layer of the magneto-optical disc 101 placed on the disc setting surface 3, are provided for movement towards and away from the spindle motor 5, that is in a direction spanning the inner and outer peripheries of the recording disc 101.

A fitting member 4 is provided at the center of the upper surface of the table section 2. The fitting member 4 is substantially conically-shaped and integrated to the table section 2. The fitting member 4 is of an outside diameter large enough to be fitted in the center aperture 102 of the recording disc 101. The fitting member 4 has its upper end, that is the distal end, as a disc-capturing tapered guide section 4a which is tapered towards its end surface, as shown in FIG. 4. The outer peripheral surface of the disc-capturing guide section 4a is curved smoothly so as to be merged with the end face of the fitting member 4. The fitting member 4 also has its distal side, that is its side proximate to the disc setting surface 3, as a columnar section 4b which is of an outside diameter substantially equal to the inside diameter of the center aperture 102 of the recording disc 102.

The outer periphery of the fitting member 4 is formed with a groove 25 engaged by a centering ring 11 constituting centering means, as shown in FIG. 3. The groove 25 has a depth extended from the distal end to a mid part of the fitting member 4 and is in the form of a annulus or toroid coaxial with the fitting member 4. The fitting member 4 has an outer peripheral upright wall delimiting the groove 25. The peripheral wall has plural cut-outs 10 in communication with the groove 25. These cut-outs 10 are extended radially from the groove 25 towards the outer surface of the fitting member 4. These cut-outs 10 are provided at equiangular intervals about an axis of the fitting member 4 as a center.

The centering ring 11, fitted into the groove 25 of the fitting member 4, is also formed as a toroid or annulus from metal or synthetic resin exhibiting flexibility and elasticity. The centering ring 11 is formed integrally with plural outwardly directed centering segments 12 for centering the recording disc loaded on the disc table. These centering segments 12 are tongue-shaped concentric radially extending lugs at equiangular intervals so as to be in register with the cut-outs 10. These centering segments 12 are in the form of spring plates so as to be deformed resiliently.

When the centering ring 11 is fitted in the groove 25, the centering segments 12 are positioned in such a manner that the proximal ends thereof are in proximity to the end face of the fitting member 4 and the distal ends thereof are directed at an angle with respect to the disc setting surface 3 and partially projected outwardly of the cut-outs 10, that is towards the outer periphery of the fitting member 4. The distal end parts of the centering segments 12 are extended on the periphery of the columnar section 4b in the direction of the disc setting surface 3. That is, the centering segments 12 are extended outwardly of the fitting member 4 at the proximal side of the fitting member 4. The distal end parts of these centering segments 12 may be intruded into and protruded out of the cut-outs 10 by the elastic deformation of the proximal pars of the centering segments 12.

Meanwhile, a toroidal-shaped groove 14 enveloping the end parts of the centering segments 12 is formed on the upper surface of the table section 2 in order to allow for elastic deformation of the centering segments 12.

The end face of the fitting member 4 is formed with a magnet mounting recess 13 which is a circular recess concentric with the fitting member 4. A magnet 9 for thrusting and supporting the recording disc 101 with respect to the table section 2 is fitted in the mounting recess 13. The magnet 9, in the form of a circular button, is adapted for magnetically attracting a magnetic plate 104 which is mounted at a mid-part of the recording disc 101 for closing the center aperture 102.

For loading the recording disc 101 on the above-described disc table according to the present invention, the recording disc 101 is fitted by its center aperture 102 over the fitting member 4, as shown in FIG. 4. Since the end face section of the fitting member 4 is smoothly merged with its disc capturing taper section 4a, the recording disc 101 is guided towards the mid-part of the fitting member 4 so as to be moved towards the distal end of the fitting member 4, with the inner rim of the center aperture 102 being in sliding contact with the outer surface of the disc capturing taper section 4a, under magnetic attraction exerted by the magnet 9 on the magnetic plate 104, even although the disc 101 is offset with respect to the fitting member 4.

Figure 5:
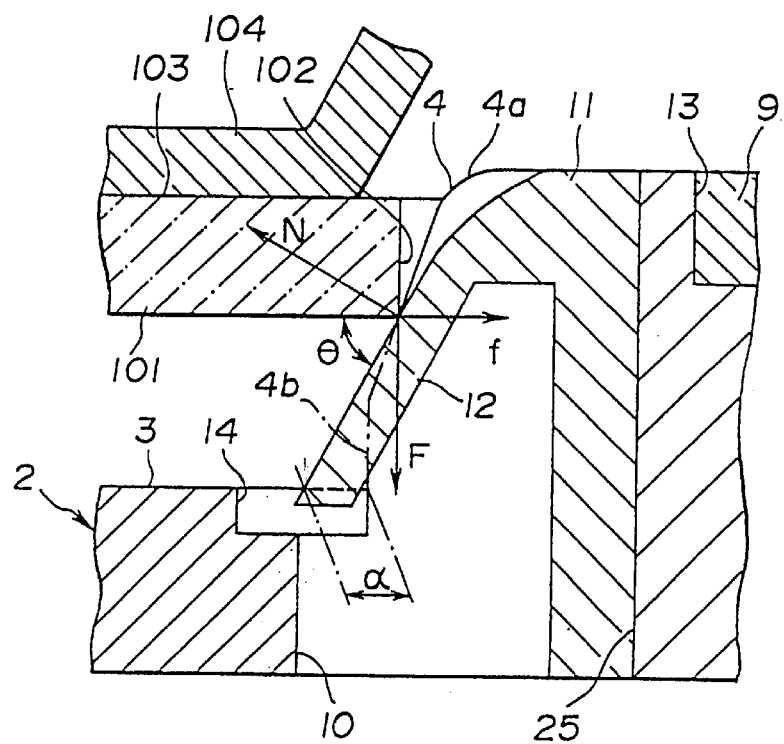
FIG. 5 is an enlarged longitudinal sectional view showing the state in which the loading of the recording disc on the disc table is started.
Figure 6:
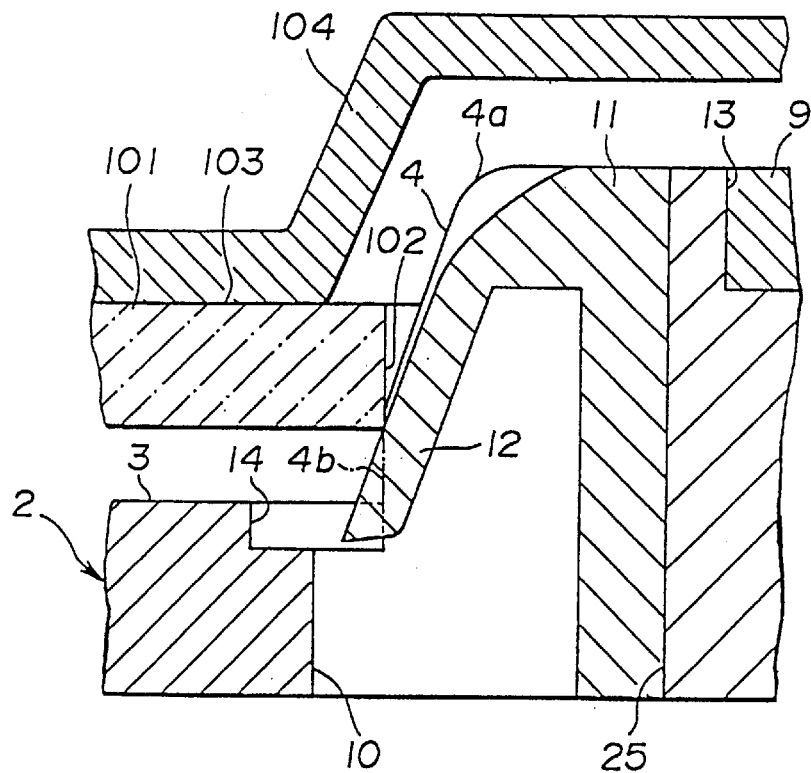
FIG. 6 is an enlarged longitudinal sectional view showing the state in which the recording disc is being loaded on the disc table.

When the recording disc 101 is moved towards the proximal side of the fitting member 4, the inner rim of the center aperture 102 is caused to bear on the centering segments 12, as shown in FIGS. 5 and 6. The disc 101 is moved towards the proximal side of the fitting member 4, with its inner rim abutting on and elastically deforming the centering segments 12 for intruding the segments 12 into the cut-outs 10. The centering segments 12 thrust the inner rim of the center aperture 102 outwards under their elasticity.

Figure 7:
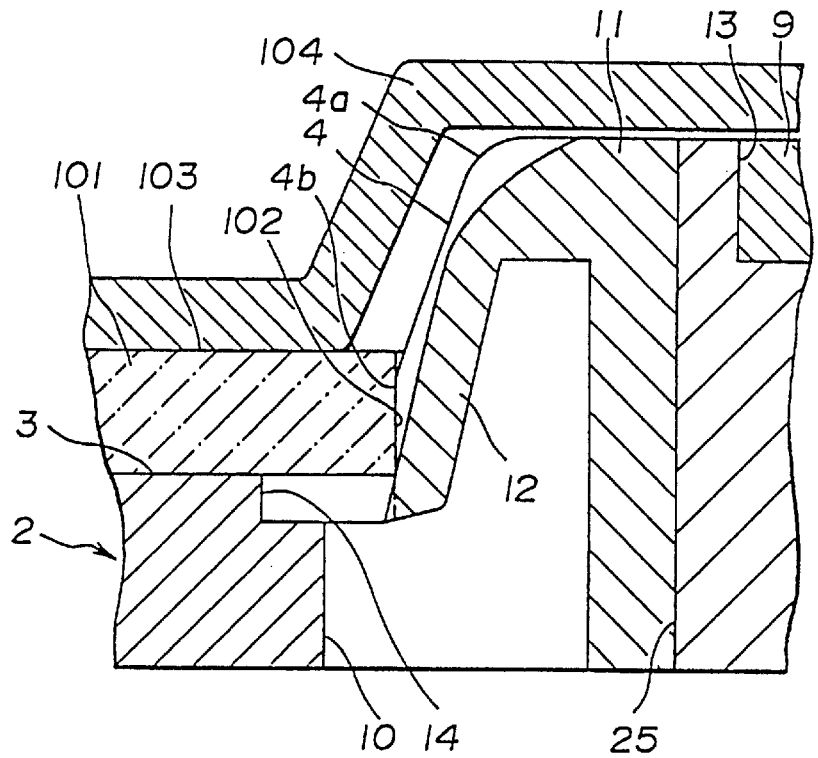
FIG. 7 is an enlarged longitudinal sectional view showing the state in which the loading of the recording disc on the disc table is completed.

When the recording disc 101 is fitted on the columnar section 4b of the fitting member 4 by its center aperture 102 and the neighboring portion to the aperture 102 of the disc is set on the disc setting surface 3, the disc 101 is centered by the inner rim of its center aperture 102 thrust by the centering segments 12, with the center of the center aperture 102 being then in register with the axis of the fitting member 4, as shown in FIG. 7.

The magnet 9 then attracts the magnetic plate 104 mounted on the recording disc 101 for pressing the disc 101 against the disc setting surface 3.

When the recording disc 101 is loaded in this manner in position on the table section 2, and the driving shaft 1 is run in rotation by spindle motor 5, the recording disc 101 is rotated in unison with the table section 5. The information signals may then be recorded and/or reproduced on or from the signal recording layer of the recording disc 101 by the optical head device or the magnetic head device.

Meanwhile, for satisfactory centering, it is necessary for the centering segments 12 to thrust the inner rim of the center aperture 102 towards the table section 2 with a sufficient pressure before the recording disc 101 is caused to bear against the disc setting surface 3. When the inner rim of the center aperture 102 of the recording disc 101 abuts on the centering sections 12, a disc attracting force F by which the magnet 9 attracts the magnetic plate 104 as indicated by arrow F in FIG. 5, a reactive force N exerted by the centering segment 12 in a normal direction shown by arrow N in FIG. 5 on the inner rim of the center aperture 102, and a thrusting force f by which the inner rim of the center aperture 102 thrusts the centering segment 12, as indicated by arrow f in FIG. 5, are generated for each of the centering segments 12. Assuming that the centering ring 11 is provided with six centering segments 12, it is necessary that the formula $$f = N \sin\theta = (F/6) \times (\sin\theta / \cos\theta) \quad (1)$$

be satisfied. In the above formula, θ is an angle by which the outer lateral surface of the centering segment 12 is inclined relative to the major surface of the recording disc 101. If the disc attracting force F is 350 gf and the angle θ is 70°, the thrusting force f is given by $$f = (350/6) \times \tan 70° = 160 \text{ gf} \quad (2)$$

and hence is 160 gf. That is, it suffices to set the elasticity of the centering segments so that, when the centering segment 12 is thrust by the thrusting force exceeding 160 gf, the centering segment 12 is resiliently biased by an amount α by which the centering segment 12 is protruded beyond the fitting member 4 on a horizontal plane including the disc setting surface 3. It is because the centering segments 12 are resiliently deflected by an amount equal to the amount the segments 12 are protruded from the fitting member 4 on the horizontal plane inclusive of the disc setting surface 3 when the recording disc 101 is set on the disc setting surface 3.

Meanwhile, the centering segments 12, exhibiting the resiliency such that the segments 12 are resiliently protruded by an amount of protrusion from the fitting member 4 on the horizontal plane inclusive of the disc setting surface 3 when the segments are thrust by the thrusting force f equal to about 160 gf, may be formed of a synthetic resin material.

A disc table according to a second embodiment of the present invention is hereinafter explained.

Figure 8:
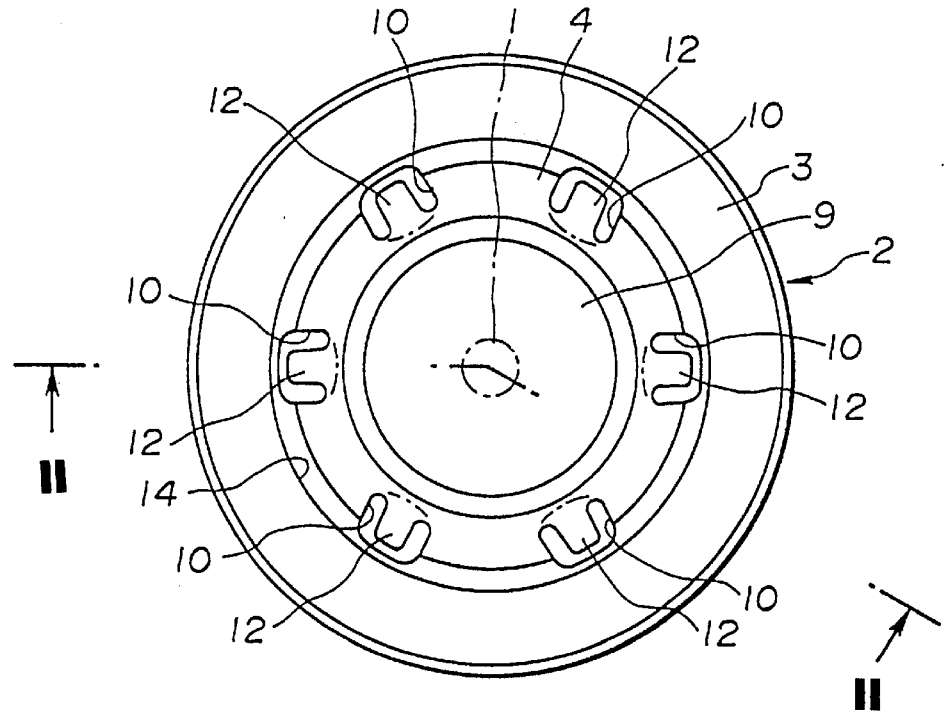
FIG. 8 is a plan view showing an embodiment of the dias table of the present invention in which the fitting member is integrated to the centering member.
Figure 9:
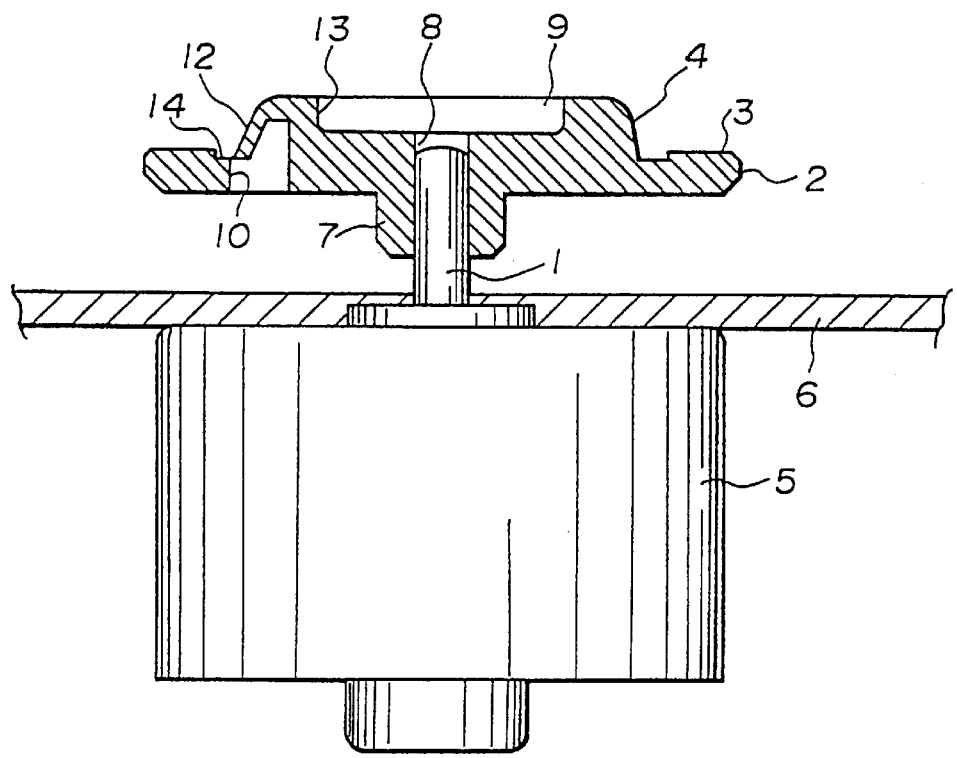
FIG. 9 is a longitudinal cross-sectional view showing the arrangement of the disc table shown in FIG. 8.

In the second embodiment of the disc table, the centering segments 12 may be integrated with the fitting member 4, as shown in FIGS. 8 and 9. That is, the fitting member 4 of the present second embodiment is made up of the fitting member 4 integrated to the centering ring 11 of the preceding embodiment.

A disc table according to a third embodiment of the present invention is hereinafter explained.

In the present third embodiment of the disc table, a plurality of clamping members 19 are provided as thrusting and supporting means, as shown in FIGS. 10 to 15. The disc table of the present embodiment is designed to hold the recording disc 101 housed for rotation in a cartridge main body to constitute a disc cartridge. In distinction from the recording disc 101 of the preceding embodiments, the recording disc 101 of the present embodiment is not fitted with the magnetic plate 104.

Figure 11:
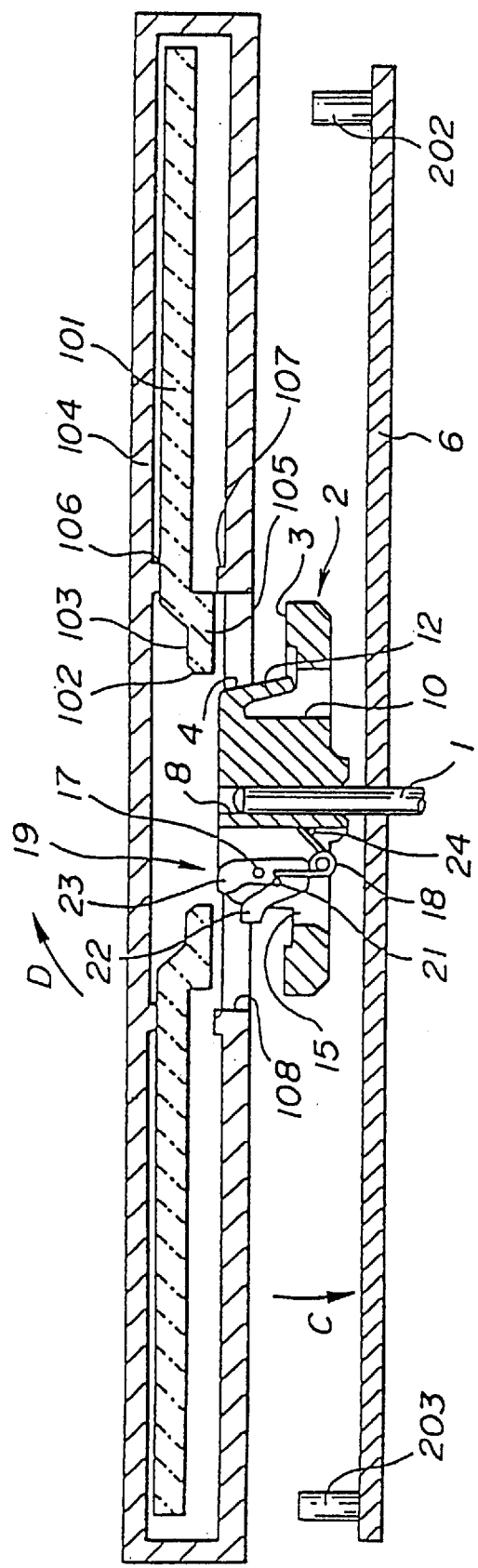
FIG. 11 is a longitudinal cross-sectional view showing arrangements of the disc table shown in FIG. 10 and the disc table loaded thereon.

The disc cartridge is made up of the recording disc 101 and a cartridge main body 104 housing the recording disc 101 therein, as shown in FIG. 11. The cartridge main body 104 is formed as a substantially rectangular casing for accommodating the recording disc 101 therein. That is, the cartridge main body 104 has a substantially square shape having a side of each of the upper and lower major surfaces extending along the major surfaces of the recording disc 101 slightly longer than the diameter of the recording disc 101. The recording disc 101 is accommodated for rotation within the cartridge main body 104.

A substantially circular chucking aperture 108 is formed in the lower major surface of the cartridge main body 104. The chucking aperture 108 is a through-hole slightly larger in diameter than the center aperture 102 of the recording disc 101 and functions to expose the center aperture 102 and its rim portion to outside.

A recording/reproducing aperture, not shown, is formed in each of the major surfaces of the cartridge main body 104. Each recording/reproducing aperture is provided for extending from the vicinity of the center of one of the major surfaces of the cartridge main body 104 as far as one of the sides of the major surface, that is the vicinity of one of the lateral sides of the cartridge main body 104. The function of these recording/reproducing apertures is to cause the optical pickup device or the magnetic head of the disc recording and/or reproducing apparatus to face the recording disc 101 when recording and/or reading the information signals on or from the signal recording surface of the recording disc 101.

A pair of annular ribs 106, 107 for controlling the movement along the thickness of the recording disc 101 within the cartridge main body 101 are formed in the vicinity of the rim of the center aperture 102 of the recording disc 101 at opposite positions on the inner wall sections of the cartridge main body 104.

Figure 10:
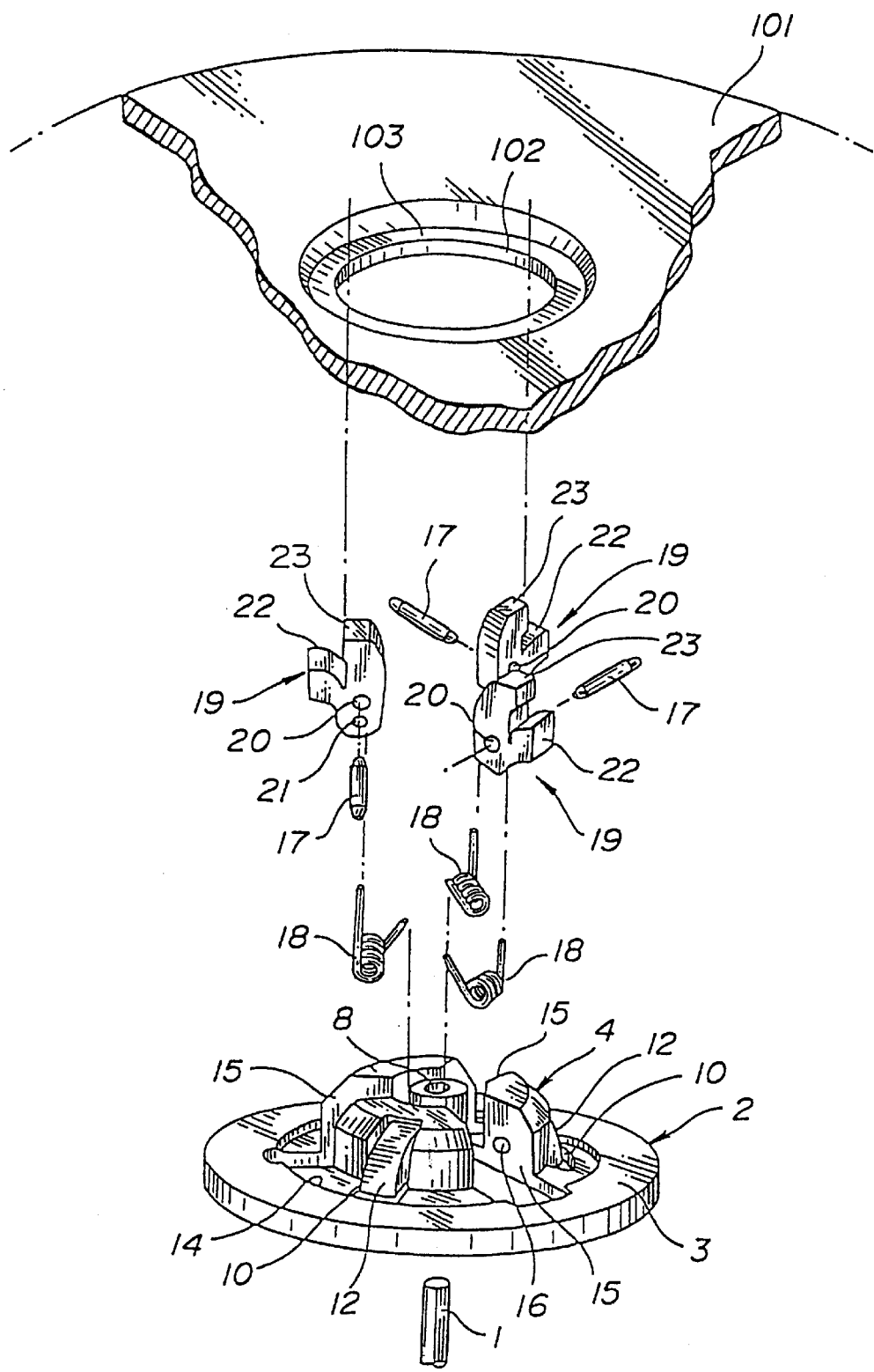
FIG. 10 is an exploded perspective view showing an embodiment of the disc table according to the present invention in which plural clamping members make up thrusting supporting means.

The disc table of the present third embodiment is provided with a table section 2, as is the disc table of each of the first and second embodiments, as shown in FIG. 10. The table section 2 has the outer peripheral region of its upper surface as the above-mentioned disc setting surface 3 and has a fitting member 4 protuberantly mounted at the mod part of its upper surface. The fitting member 4 has plural centering segments 12.

With the present disc table, the fitting member 4 has plural clamping members 19, 19, 19 each having its mid-part supported for rotation. These clamping members 19 are mounted in radially extending clamping member mounting slits 15, 15, 15 provided in the fitting member 4. These clamping members 19 are supported by supporting shafts 17 which are provided in the clamping member mounting slits 15 and which are passed through shaft inserting holes 20 provided at the mid-part of the clamping members 19. The supporting shafts 17 are formed so that the axial directions thereof extend along the tangent of a circle having the center axis of the table section 2 as a center. The clamping member 19 is formed as a substantially T-shaped member having arms extending in two opposite directions form the mid-part provided with the shaft inserting hole 20 and a third arm extending in a direction substantially normal to these two arms. One of the two arms of the clamping member 19 extending in the two opposite directions functions as the clamping section 23, while the third arm extending in the direction substantially normal to the clamping section 23 functions as a thrust section 22.

Each of the clamping sections 19 in its initial state has the thrust section 22 protruded radially out of the fitting member 4 so as to overlie the disc setting surface 3, while having the clamping section 23 housed within the clamping member mounting slit 15, as shown in FIG. 11. Since each of the clamping sections 19 in its initial state is housed within the clamping member mounting slit 15, there is no fear of the clamping member 19 being rotated or damaged by foreign matter or the user's finger being inadvertently introduced at the distal end of the fitting member 4.

Meanwhile, the clamping member mounting slits 15 are each formed for extending as far as a position of the disc setting surface 3 faced by the thrust sections 22.

Between each clamping member 19 and the table section 2, a torsion coil spring 18 for rotationally biasing the clamping member 19 in a direction away from a neutral rotational position of the clamping member 19 is provided in association with each clamping member 19. Each of the torsion coil springs 18 resiliently biases a retention pin 21, provided on the other of the two arm sections extended in the two opposite directions, that is the arm section opposite to the clamping section 23 with the shaft inserting opening in-between, in a direction outwardly of the table section 2. Each of the torsion coil springs 18 has one of its arm sections engaged with an engaging pin 21 of each of the clamping members 19, while having the other arm section retained by a retention section 24 provided in each of the clamping member mounting slits 15. The clamping members 19, 19, 19 are rotationally biased at this time so that the thrust sections 22 thereof are directed to the upper end face of the fitting member 4 in FIG. 10, as indicated by arrows D in FIGS. 11 and 12.

Figure 12:
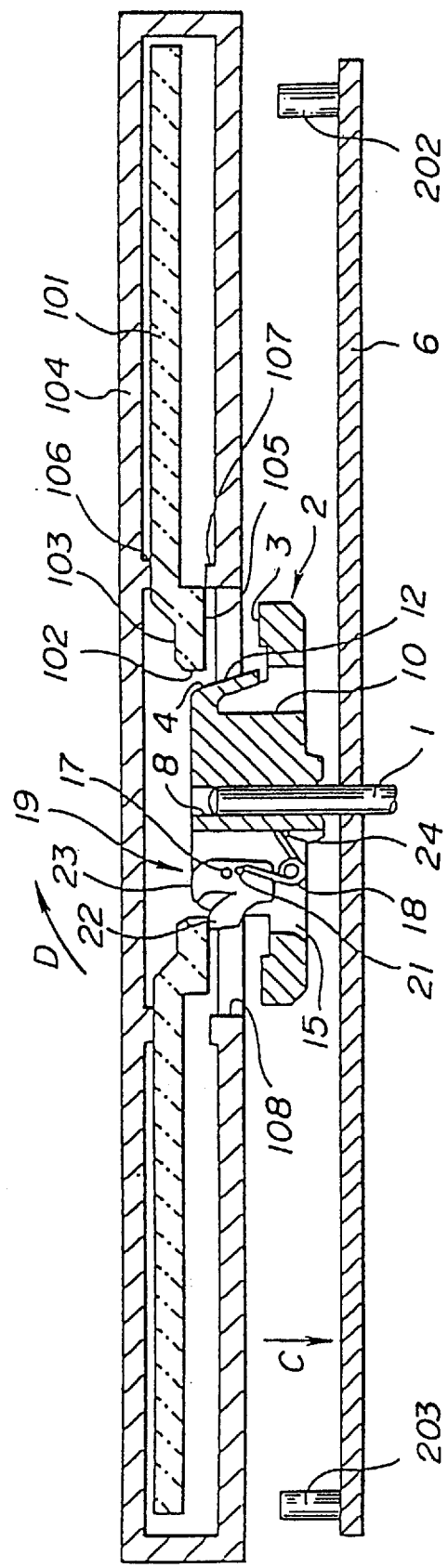
FIG. 12 is a longitudinal cross-sectional view showing the state in which the loading of a disc cartridge on the disc table shown in FIG. 10 is started.
Figure 13:
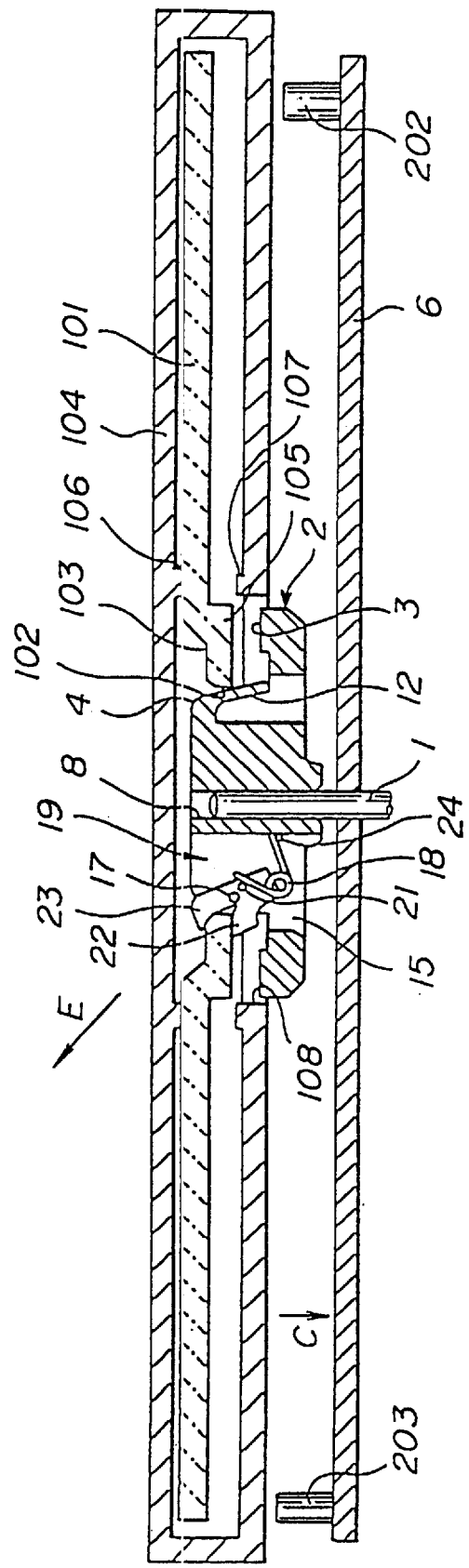
FIG. 13 is a longitudinal cross-sectional view showing the state in which the disc cartridge is being loaded on the disc table shown in FIG. 10, with the clamping members being in a neutral position.
Figure 14:
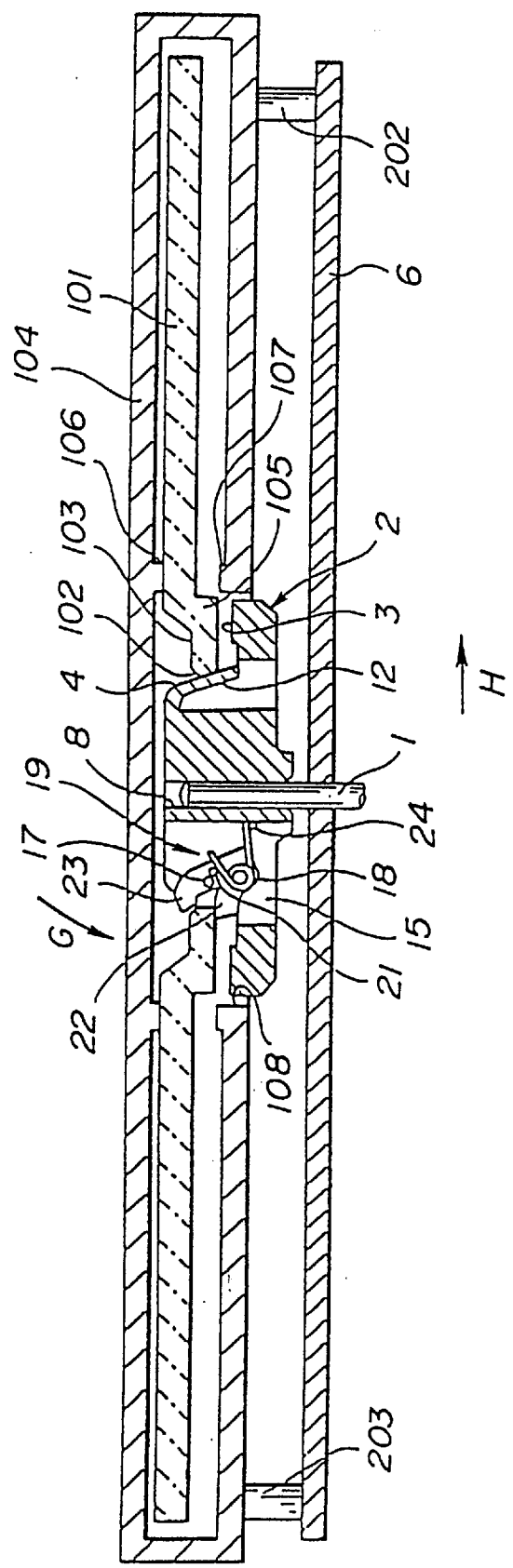
FIG. 14 is a longitudinal cross-sectional view showing the state in which the disc cartridge is being loaded on the disc table shown in FIG. 10, with the clamping members being biased downwards.
Figure 15:
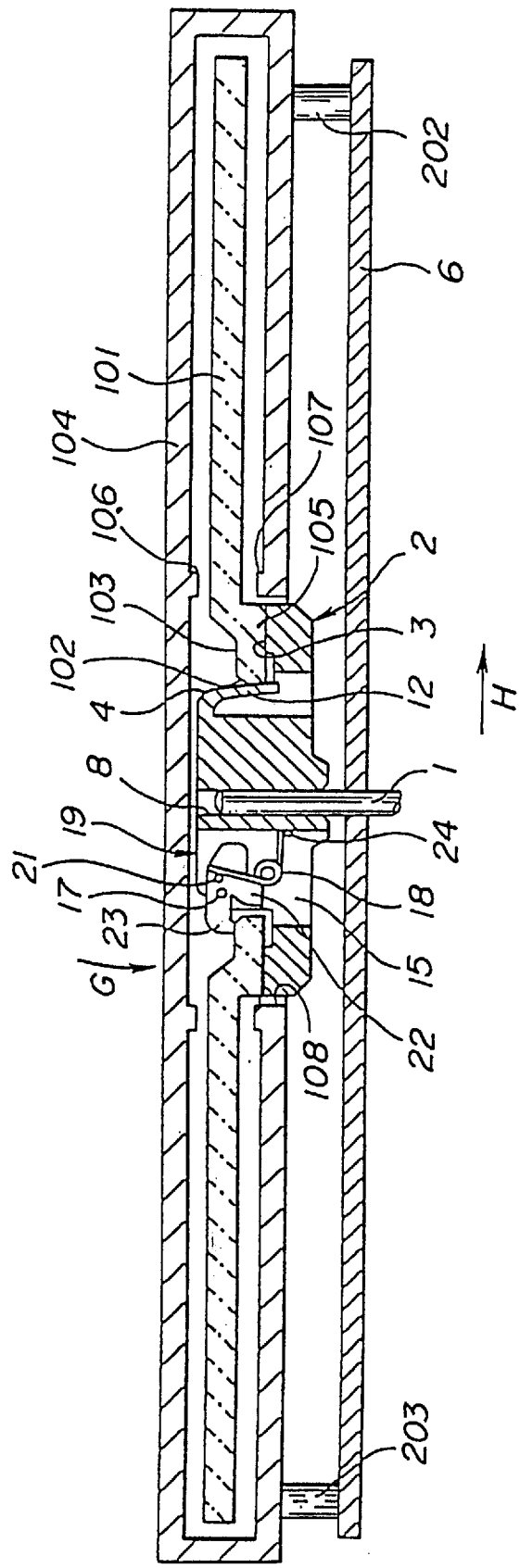
FIG. 15 is a longitudinal cross-sectional view showing the state in which the loading of a disc cartridge on the disc table shown in FIG. 10 is completed.

The neutral rotational position of the clamping member 19 is the position at which it has been turned from the above-mentioned initial state in a direction of shifting the thrust section 22 towards the disc setting surface 3, and at which the retention section 24, retention pin 21 and the supporting shaft 17 are on a straight line, as shown in FIG. 13. In this state, each of the torsion coil springs 18 biases the associated clamping member 19 in a direction proceeding from the retention pin 21 towards the supporting shaft 17, as shown by arrow E in FIG. 13. That is, the torsion coil spring 18 rotationally biases the associated clamping member 19 in a direction shown by arrow D in FIGS. 11 and 12 when the clamping member 19 is at a position rotated in one direction from the neutral position, as shown in FIGS. 11 and 12. On the other hand, when the clamping member 19 is at a position rotated in the opposite direction from the neutral position, as shown in FIGS. 14 and 15, the torsion coil spring rotationally biases the clamping member 19 in the opposite direction as indicated by arrow in FIGS. 14 and 15.

With the above-described disc table of the third embodiment according to the present invention, when the operation of setting the recording disc 101 on the table setting surface 3 of the table section 2 is initiated, as shown by arrow C in FIG. 12, the distal end of the fitting member 4 is inserted into the center aperture 102 of the recording disc 101. The recording disc 101 has its set section 105 around its center aperture 102 on its opposite major surface abutted against the thrust section 22.

When the recording disc 101 is moved towards the disc setting surface 3, each clamping member 19 has its thrust section 22 thrust by the set section 105 of the recording disc so that the thrust section 22 is rotated in a direction of approaching the disc setting surface 3 against the bias of the torsion coil sparing 18, as shown in FIG. 13. Each of the clamping members 19 is rotated in this manner to the above-mentioned neutral rotational position.

When the recording disc 101 is moved towards the disc setting surface 3, each clamping member 19 has its thrust section 22 thrust by the set section 105 of the recording disc 101, as shown in FIG. 13, so that the thrust section 22 is rotated against the bias of the torsion coil spring 18 in a direction of approaching the disc setting surface 3. In this manner, the clamping section 19 is rotated to the above-mentioned neutral rotational position.

When the recording disc 101 further approaches the disc setting surface 3, the thrust section 22 of each of the clamping members 19 is thrust by the set section 105 of the recording disc 105, so that the thrust section 22 is rotated beyond the neutral rotational position in a direction of approaching the thrust section 22 to the disc setting surface 3, as shown in FIG. 14. At this time, each clamping section 19 causes the thrust section 22 to be rotated in a direction of further approaching to the disc setting surface 3, under the bias of the torsion coil spring 18 and under the thrusting force exerted by the set section of the disc on the thrust section 22, as indicated by arrow G in FIG. 14. The cartridge main body 104 is loaded in position on a chassis 6 by being caused to bear against he distal ends of positioning pins 202, 203 mounted upright on the chassis 6.

Meanwhile, the table section 2 is intruded into the inside of the cartridge main body 104 via chucking aperture 108 provided in the cartridge main body 104.

Under the thrust exerted by the set section 105 against the thrust section 22 and the bias exerted by the torsion coil spring 18, each clamping member 19 causes the thrust section 22 to be rotated in a direction of approaching to the disc setting surface 3. The clamping members 19 cause the thrust sections 22 to be moved away from the set section 105, while causing the clamp sections 23 to bear against a recess 103 formed in the rim of the center aperture 102 in one of the major surfaces of the recording disc 101. The result is that the recording disc 101 is thrust and supported on the disc setting surface 3 by the clamping member 19, as shown in FIG. 15. At this time, the recording disc 101 has its center of rotation coincided with the axis of the disc table by the centering segments 12 of the fitting member 4 by way of performing a centering operation.

If the spindle motor 5 rotates the driving shaft 1 at this state, the recording disc 101 is rotated in unison with the table section 2. The information signals may be recorded on or reproduced from the signal recording layer by the optical pickup device or the magnetic head device.

For dismounting the recording disc 101 from the table section 2, it suffices to move the recording disc 101, along with the cartridge main body 104, in an upward direction away from the disc setting surface 3. Each of the clamping members 19 has its clamping section 23 thrust upwards by the recording disc 101 so as to be rotated beyond the above-mentioned neutral rotational position so as to be returned to its initial position.

With the present disc table, not only the recording disc 101 housed within the cartridge main body 104, but also the recording disc 101 not housed within the cartridge main body 104, may be set with correct centering on the disc setting surface 3, as hereinabove described. The number of the clamping members may be at least two or four or more in stead of three in the above described embodiments.

A disc table of a fourth embodiment according to the present invention is hereinafter explained.

Figure 16:
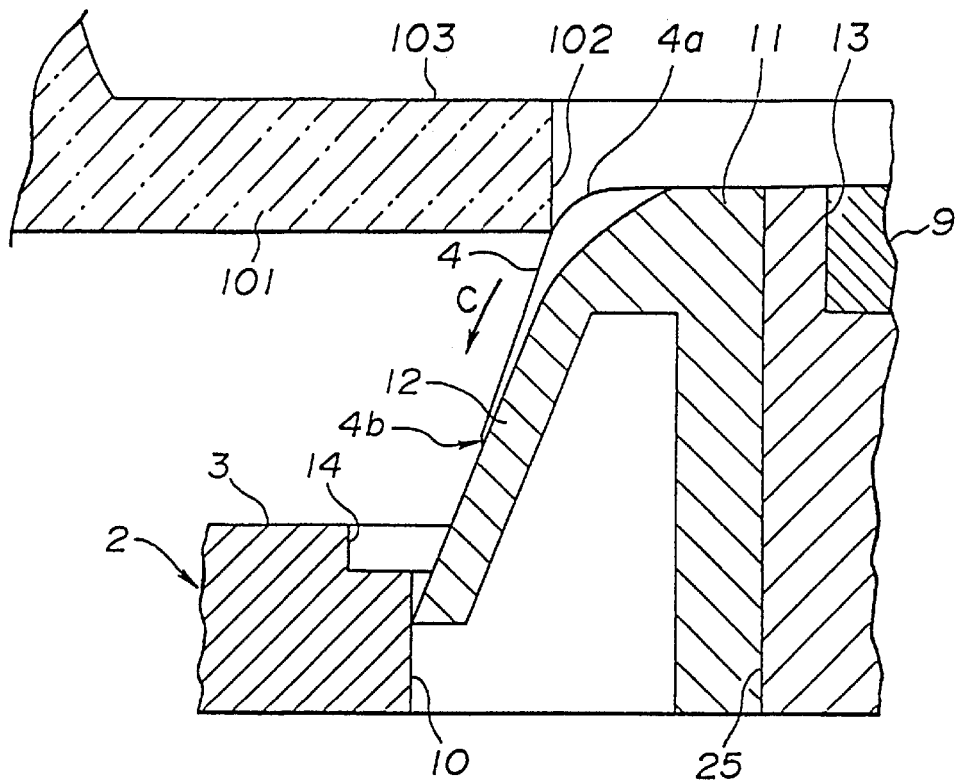
FIG. 16 is a longitudinal cross-sectional view of a modification of the essential parts of the disc table showing the state in which the loading of a disc cartridge on the disc table is started.

In the present embodiment, the centering segments 12 may be mounted in a stressed state, that is in a state of being resiliently flexed inwardly towards the center axis of the fitting member 4, as shown in FIG. 16, instead of in a natural or stress-free state, that is in a state free from resilient flexing. In this case, the centering segments 12 have their distal ends intruded into the cut-outs 10 in the inwardly resiliently flexed or stressed state so that the distal ends are caused to bear against the inner wall sections of the cut-outs 10. That is, with the present disc table, the inner wall sections of the cut-outs 10 act as resetting controlling sections for controlling the resetting of the centering segments 12 to their natural state.

Figure 17:
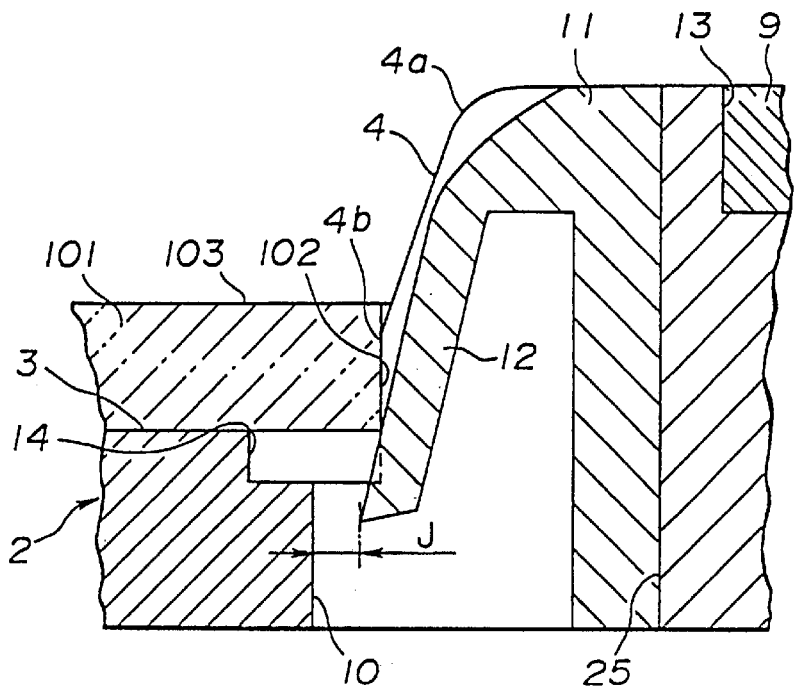
FIG. 17 is a longitudinal cross-sectional view showing the state in which the loading of a disc cartridge on the disc table shown in FIG. 16, is completed.

When the recording disc 101 is set on the disc setting surface 3 of the table section 2, as shown by arrow C in FIG. 16, the centering segments 12 are thrust and resiliently flexed by the inner rim of the center aperture 102 of the recording disc 101, while thrusting the inner rim of the center aperture 102, as shown in FIG. 17. At this time, each of the centering segments 12 has its distal end resiliently biased from the position of being caused to bear against the inner wall section of the cut-out 10 to the position of being caused to bear against the inner rim of the center aperture 102 of the recording disc 101, as shown by arrow J in FIG. 17.

Since the centering segments 12 are not biased from their unstressed state, it is possible for these centering segments 12 to exhibit a sufficient thrusting force corresponding to the displacement from the unstressed state, which thrusting force may be exerted on the inner rim of the center aperture 102 of the recording disc 101, even although the segments 12 deemed as spring plates are of a small spring constant. Consequently, the recording disc 101 may be correctly centered by these centering segments 12. Besides, in the initial state in which the recording disc 101 is not loaded, the centering segments 12 are controlled in their positions by the inner wall sections of the cut-outs 10 and hence positioned with great accuracy.

A disc table of a fifth embodiment according to the present invention is hereinafter explained.

Figure 18:
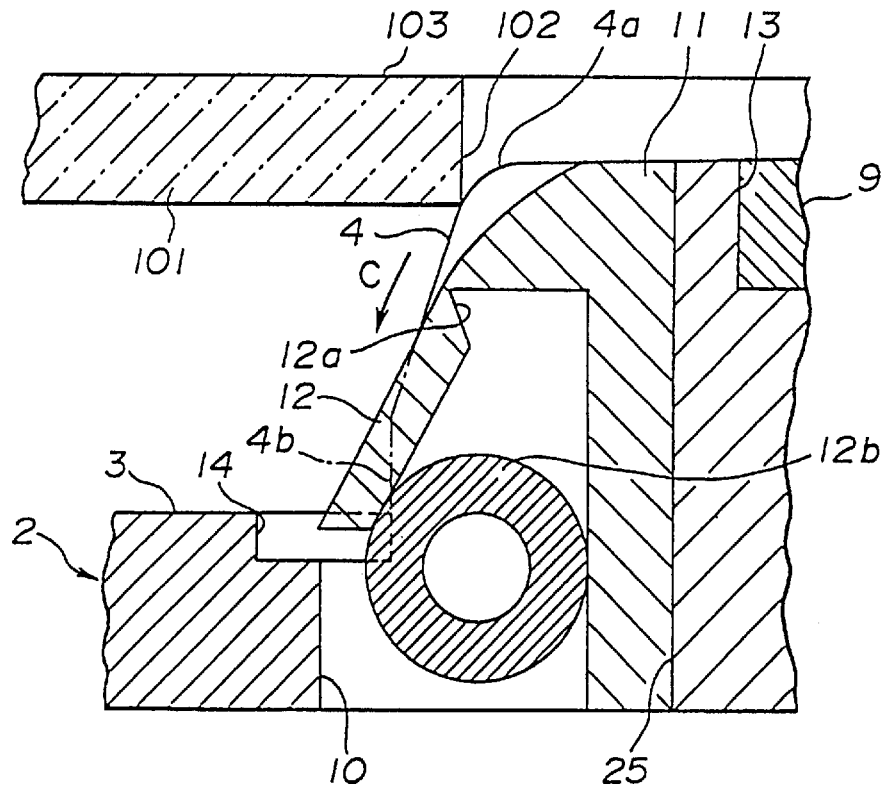
FIG. 18 is a longitudinal cross-sectional view of another modification of the essential parts of the disc table showing the state in which the loading of the disc cartridge on the disc table is started.

By the way, the centering means in the disc table of the present fifth embodiment is not limited to plural centering segments in the form of plural spring plates, as those shown in the above-described embodiments, but may consist in plural centering segments 12 connected to an annular section of the centering ring 11 via hinges 12a, and an elastic member 12b, as shown in FIG. 18.

The centering segments 12 are pawl-shaped lugs disposed at equiangular intervals in register with the cut-outs 10 for extending radially relative to the annular section of the centering ring 1. These centering segments are intruded into the cut-outs 10. Similarly to the centering segments 12 of the preceding embodiments, each of the centering segments of the present embodiment has only its distal end projected out of the fitting member 4 at the proximal part of the fitting member 4. Each hinge 12a is formed at the proximal side of each centering segment 12 by locally reducing the thickness of the centering segment 12. The centering segments 12 may be biased in a direction of being protruded out of or being receded inwardly of the fitting member 4 by resilient flexure of the hinge 12a. The elastic member 12b is formed substantially as an annulus from an elastic material, such as butyl rubber, and is interposed between the centering segments 12 and the annular section of the centering ring 11. That is, the elastic member 12 is fitted to the outer side of the annular section of the centering ring 11 and is disposed inwardly of the centering segments 12.

Figure 19:
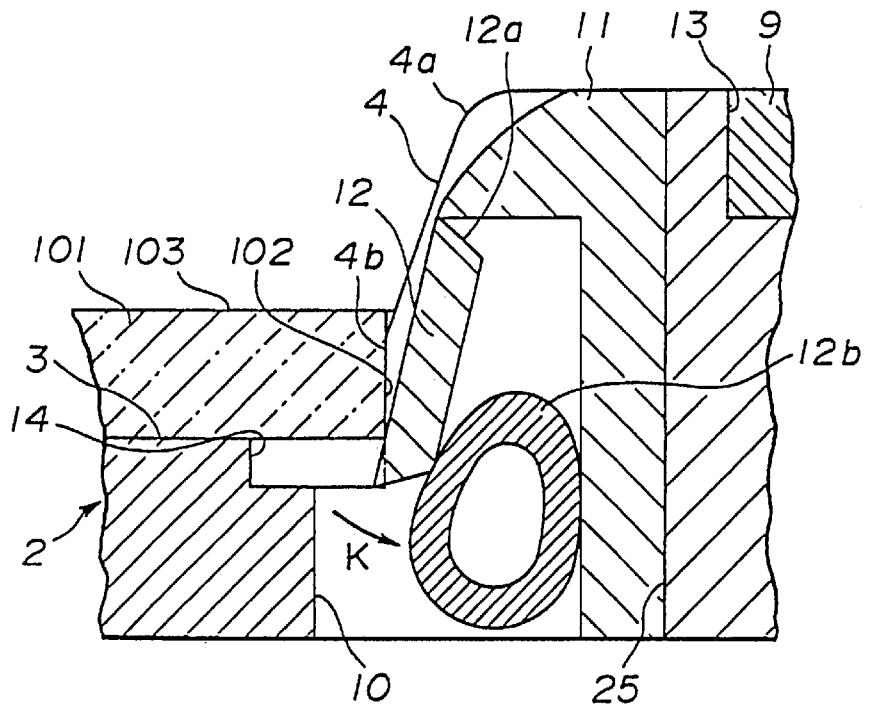
FIG. 19 is a longitudinal cross-sectional view showing the state in which the loading of the disc cartridge on the disc table shown in FIG. 18 is completed.
Figure 20:
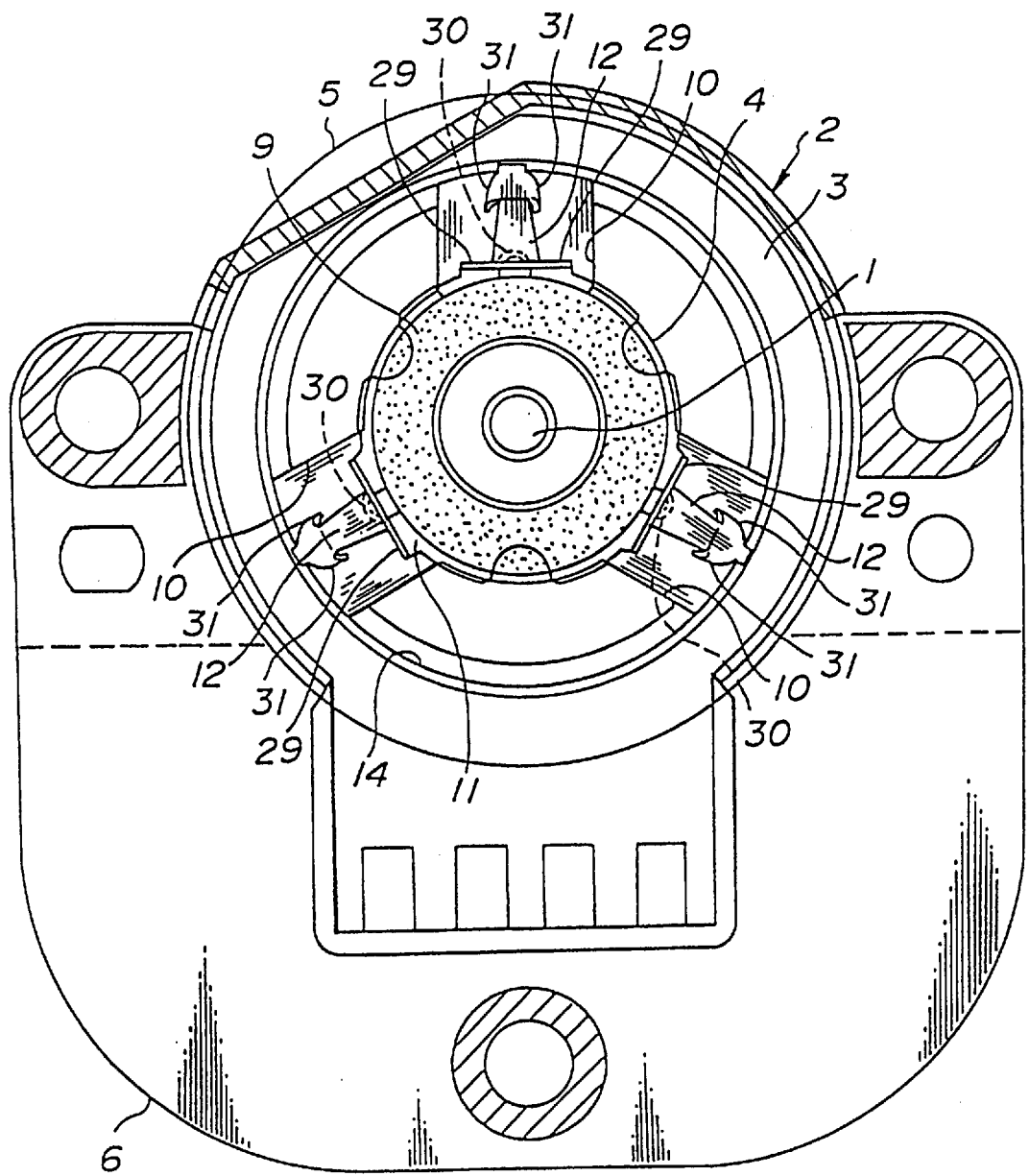
FIG. 20 is a plan view showing an embodiment in which a disc table according to the present invention is constituted using a centering member consisting in a spring plate formed of a metallic material.

When the recording disc 101 is set on the disc setting surface 3 of the table section 2 of the disc table, as shown by arrow C in FIG. 18, the centering segments 12 are displaced by being thrust by the inner rim of the centering aperture 102 to compress the elastic member 12b, as shown by arrow K in FIG. 19, with the inner rim of the center aperture 102 in turn being thrust by the elastic recoil of the elastic member 12b.

Since the displacement of the centering segments 12 at this time is not an elastic displacement, the centering segments 12 are not susceptible to creep even after repeated displacement and hence exhibit excellent durability. Since the thrusting force against the inner rim of the center aperture 102 of the recording disc 101 is obtained by the force of elastic recoiling of the elastic member 12b, the thrusting force may be increased to a sufficient level by suitably selecting the material and/or the shape of the elastic member 12b. Consequently, the recording disc 101 may be satisfactorily centered by the centering segments 12.

A disc table of the sixth embodiment according to the present invention and the method for producing the disc table according to the present invention are hereinafter explained.

The disc table of the sixth embodiment may be constituted using a centering ring 11 formed of a metallic spring plate material, as shown in FIGS. 20 to 22, 24 and 25.

Similarly to the disc tables of the preceding embodiments, the present disc table is also provided with a table section 2 supported by being fitted on the outer surface of the driving shaft 1 of the spindle motor 5. The table section 2 is formed substantially as a disc from a synthetic resin and has a center through-hole 8 engaged by the driving shaft 1. The table section 2 has a perimetral portion of its upper surface as a disc setting surface 3 for setting the recording disc 101 thereon.

Figure 21:
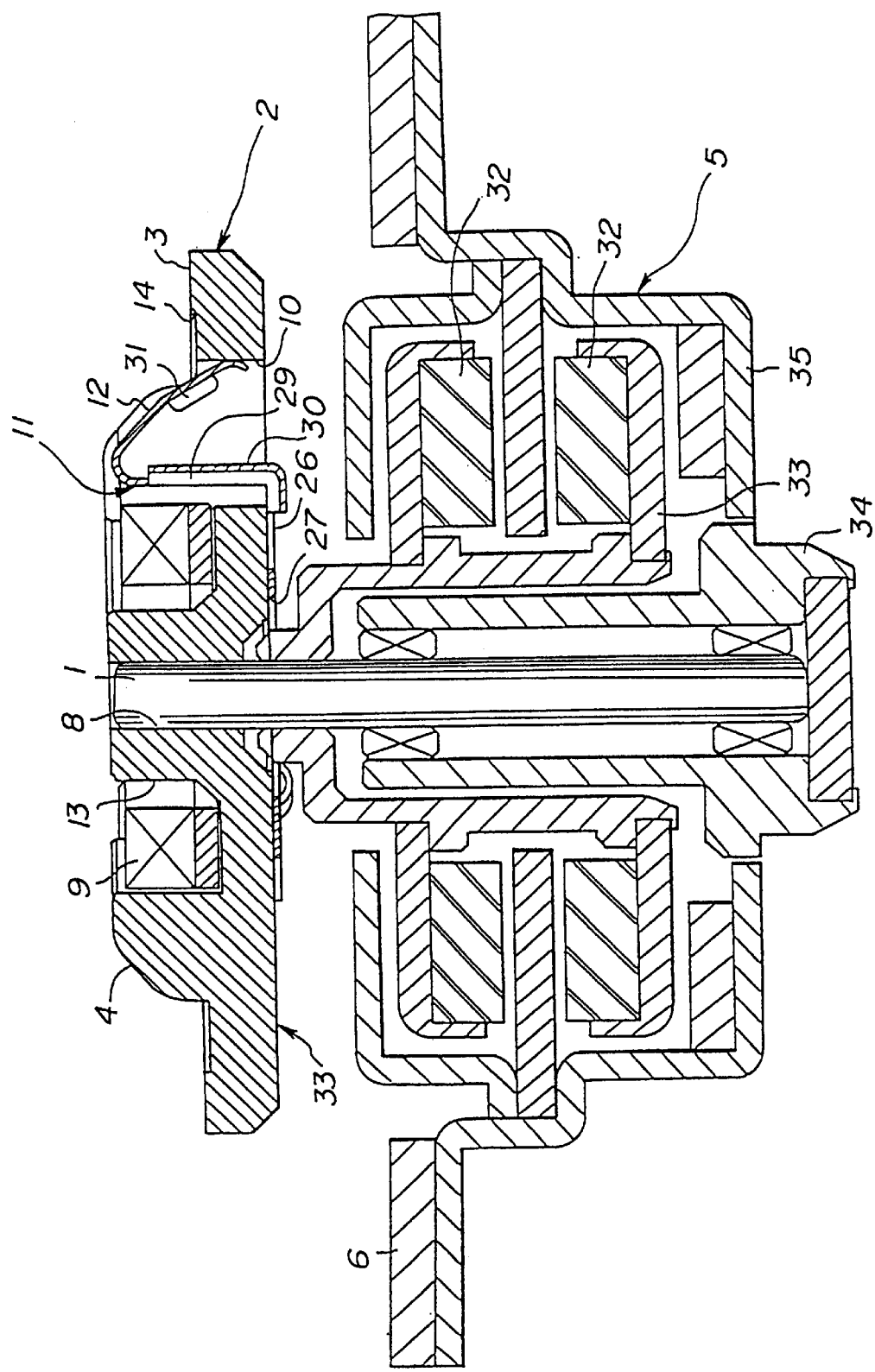
FIG. 21 is a longitudinal cross-sectional view showing a construction of the disc table shown in FIG. 20.

Referring to FIG. 21, the spindle motor 5 for rotationally driving the disc table is mainly made up of an outer casing 35, a bearing 34 supported by the outer casing 35 for rotatably supporting the driving shaft, annular magnet 32, 32 mounted on the driving shaft 1 via a magnet supporting member 33 and a coil base plate mounted facing the magnets 32, 32 within the outer casing 35. The spindle motor 5 is supported by having the outer casing 35 mounted on the lower surface of the chassis 6 so that the driving shaft 1 is protruded above the chassis 6 via a through-hole bored in the chassis 6.

A fitting member 4 is projectedly formed at the center of the upper surface of the table section 2, as in the disc tables of the preceding embodiments. That is, the fitting member 4 is formed with the table section 2 in substantially a conical shape and has an outside diameter large enough to be engaged in the center aperture 102 of the recording disc 101. The distal part of the fitting member 4 is a guide section for capturing the recording disc 101. The part of the fitting member 4 lying close to the disc setting surface 3 is a columnar section 4b having an outside diameter substantially equal to the inside diameter of the center aperture 102 of the recording disc 101.

Figure 24:
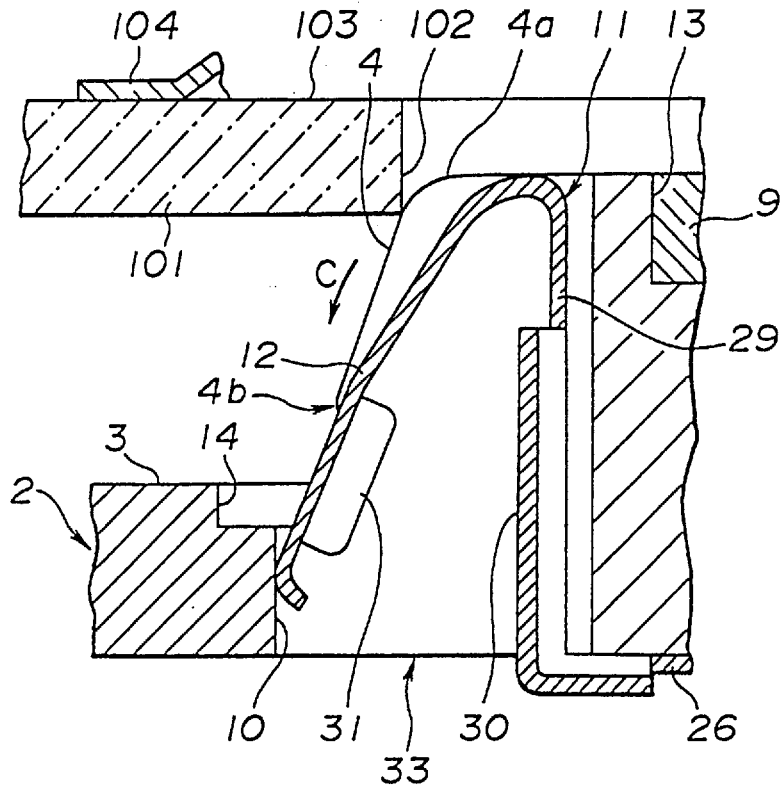
FIG. 24 is an enlarged longitudinal sectional view showing the recording disc being loaded on the disc table shown in FIG. 20.
Figure 25:
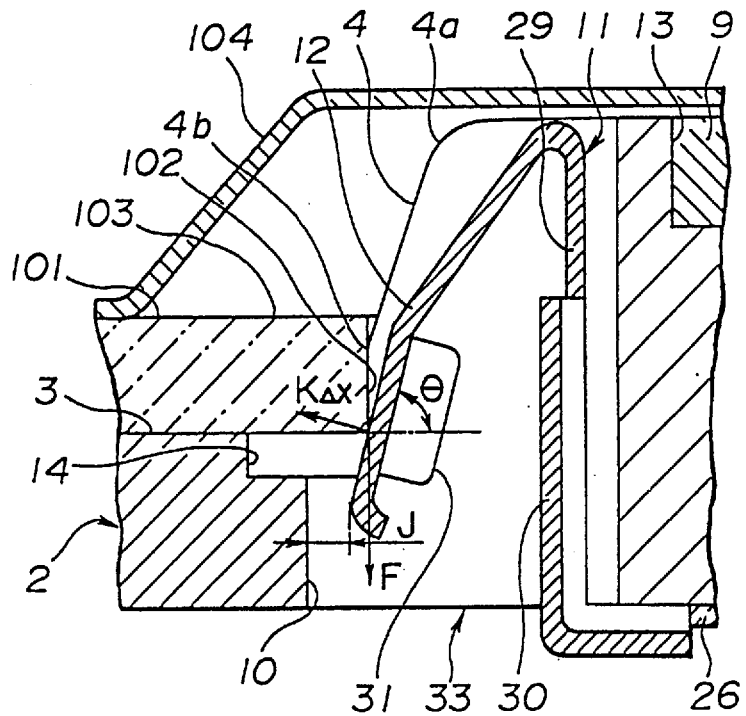
FIG. 25 is an enlarged longitudinal sectional view showing the state in which the loading of the recording disc on the disc table shown in FIG. 20 is completed.

The distal end face of the fitting member 4 has a magnet mounting recess 13 which is formed as an annular groove concentric with the fitting member 4. Within this magnet mounting recess 13 is mounted an annular magnet 9 acting as thrusting and supporting means. The magnet 9 is used for attracting a magnetic plate 104 mounted at the mid-part of the recording disc 101 for closing the center aperture 102, as shown in FIGS. 24 and 25. A magnetic yoke formed of a high permeability material may be provided on the lower surface of the magnet 9, that is between the magnet 9 and the fitting member 4.

The fitting member 4 has plural cut-outs 10 in communication with the magnet mounting recess 13. These cut-outs 10 are formed outwardly of the magnet mounting recess 13 for extending radially from the magnet mounting recess 13 through the proximal side of the fitting member 4 as far as a disc-shaped part of the table section 1. These cut-outs 10 are provided at three points at an angular interval of 120° relative to each other.

Figure 22:
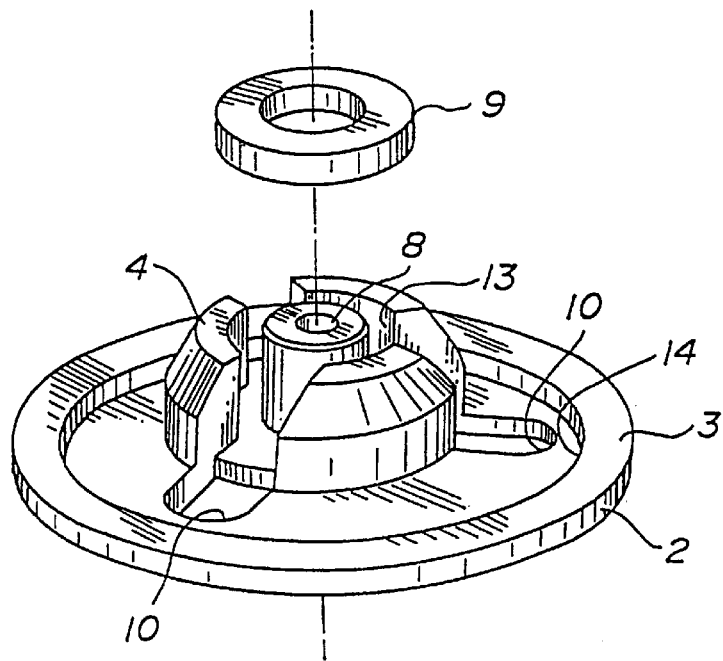
FIG. 22 is an exploded perspective view showing the construction of the disc table shown in FIG. 20.
Figure 22:
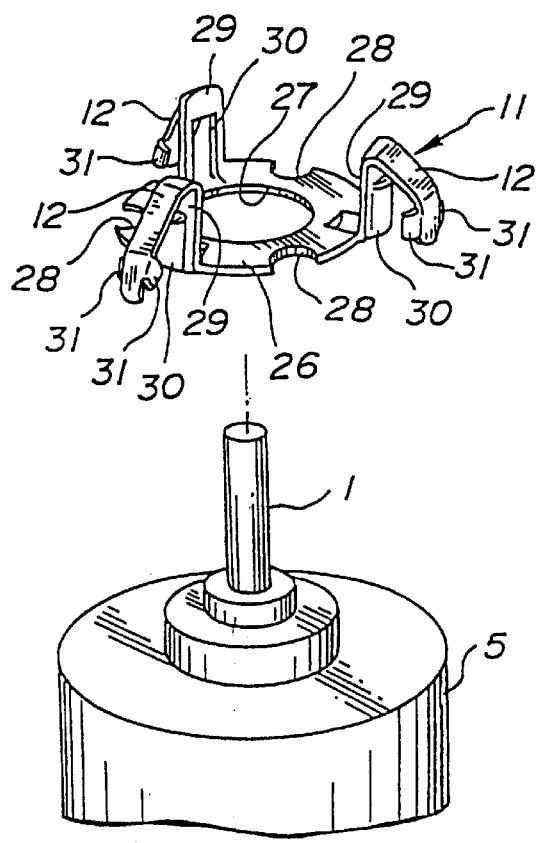

A centering ring 11, constituting centering means for aligning the center of rotation of the recording disc 101 with the axis of the disc table, is mounted on the lower surface of the table section 2 so that the centering segments 12, 12, 12 functioning as the centering members are located within the cut-outs 10, 10, 10 of the fitting member 4. The centering ring 11 is formed as one from a plate-shaped metallic spring material by punching and press working. The centering ring 11 comprises a substantially disc-shaped base section 26, three upstanding supporting projections 29 provided on the perimetral portions of the base section 26 and three centering segments 12 extending outwardly from the distal ends of these supporting projections 29, as shown in FIG. 22.

The base section 26 has a central through-hole 27 having a diameter sufficiently larger than the outside diameter of the driving shaft 1.

The supporting projections 29, 29, 29 are formed upright around the perimeter of the base section 26 at an equiangular interval of 120° relative to one another. These supporting projections 29 are formed by bending three tongues extending outwardly from the outer perimeter of the base section 26 by press working. These supporting projections 29 are formed with drawn parts 30, 30, 30 extending outwards from the base section 26. These drawn parts are formed by drawing so that part of the spring material of the centering ring 11 is bent to form rib-shaped projections extending from the supporting projections 29 and the base section 26. These drawn parts 30 prevent the supporting projections 29 from being tilted with respect to the base section 26.

The proximal ends of the centering segments 12 are formed as continuation of the distal ends of the supporting projections 29. These centering segments 12 are positioned outwardly of the supporting projections 29, that is at a distance from the base section 26, and are inclined downwardly from the distal ends of the supporting projections 29. The distal end of each of the centering segments 12 is formed with a pair of bent tabs 31,31. These tabs 31, 31 are formed as tongues on the opposite lateral sides of the centering segments 12 and arcuately bent towards the center of the base section 26. These centering segments 12 and the tabs 31, 31 of each of these segments are formed by press-working the parts extended horizontally from the supporting projections 29.

The perimetral part of the base section 26 is formed with three equiangular cut-outs 28 for accommodating an adhesive which are disposed between the supporting projections 29. These cut-outs 28 are substantially semicircular in contour.

The centering segments 12 are intruded into the cut-outs 10 by the base section 26 being mounted on the lower surface of the table section 2. The base section 26 is mounted on the table section 2 by applying an adhesive, such as a so-called UV curable resin, in the cut-outs 28 for adhesive, while the major surface of the base section 26 is kept in pressure contact with the lower surface of the table section 2. The distal ends of the supporting projections 29 are positioned at this time around the perimeter of the magnet 9 and are spaced apart from the magnet 9 and the fitting member 4. These centering segments 12 may be biased resiliently.

With the centering ring 11 mounted on the table section 2, each of the centering segments 12 has its proximal end positioned in the vicinity of the distal end face of the fitting member 4, and is supported with a tilt relative to the disc setting surface 3, so that part of the distal end thereof is projected outwardly from the cut-out 10, that is in the direction of the perimeter of the fitting member 4, as shown in FIG. 24. The distal end of each of these centering segments 12 may be projected beyond or receded with respect to the peripheral surface of the fitting member 4 by elastic deformation of the proximal part of each of the segments 12. The distal end of each of these segments 12 is disposed below the disc setting surface 3 so as to be caused to bear against the inner wall of the cut-out 10. The centering segments 12 are resiliently biased at this time closer to the base section 26 than when the segments 12 are in the stress-free state.

Figure 23:
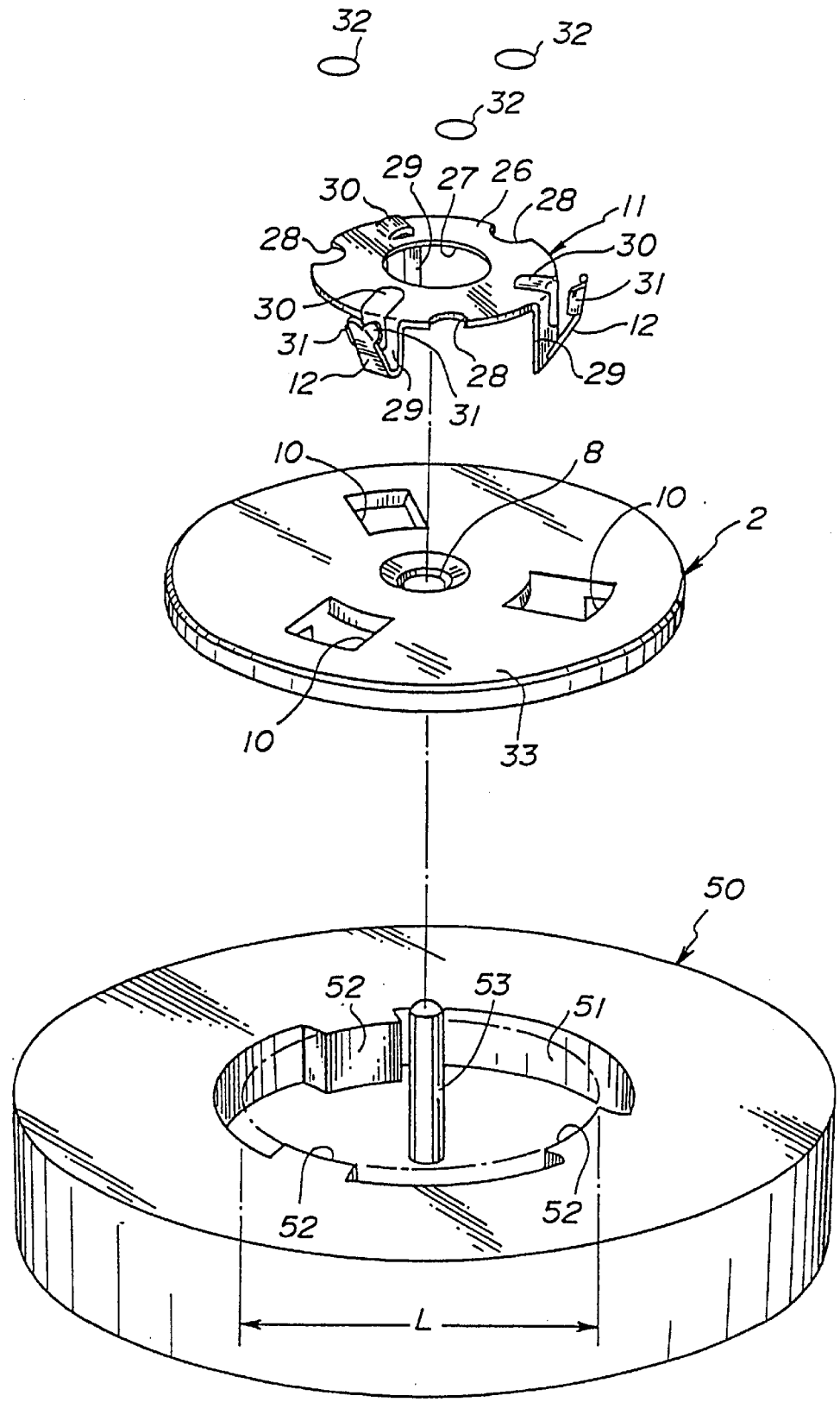
FIG. 23 is a perspective view illustrating the method for producing the disc table according to the present invention showing the process for producing the disc table shown in FIG. 20.

The method for producing the disc table having the centering ring 11 formed of the spring plate material is hereinafter explained in detail. For producing the disc table, a positioning jig 50 shown in FIG. 23 is employed. The positioning jig 50 has a block-shaped main body having a recessed positioning hole 51. A reference shaft 53 having a outside diameter substantially equal to that of the driving shaft 1 of the spindle motor 5 is mounted upright on the bottom surface of the positioning hole 51. Part of the inner wall of the positioning hole 51 is formed as wall sections 52, 52, 52 for abutment with the centering segments 12 in register with the cut-outs 10, 10, 10. The portions of the inner wall other than the wall sections 52, 52, 52 are enlarged in diameter radially outwardly of the wall sections 52, 52, 52. These wall sections 52, 52, 52 are designed to form a part of a cylindrical surface coaxial with the reference shaft 53. The diameter of the cylindrical surface enveloping the wall sections 52, shown by arrows L in FIG. 23, is selected to be slightly smaller than the inside diameter of the center aperture 102 of the recording disc 101, and is typically on an order of 10.98 to 10.99 mm for the inside diameter of the center aperture 102.

In the method for producing the disc table according to the present invention, the reference shaft 52 is fitted into the fitting thorough-hole 8 for the table section 2 bored in the fitting member 8, as shown in FIG. 23. At this time, the reference shaft 53 is engaged in the fitting through-hole 8, as the fitting member 4 is faced by the positioning hole 51 so that the fitting member 4 may be fitted into the positioning hole 51. At this time, the cut-outs 10 are in register with the wall sections 52.

The centering ring 11 is then set on the table section 2 loaded on the positioning jig 50. The centering ring 11 has its base section 26 set on the lower surface of the table section 2 so that the centering segments 12 are introduced into the cut-outs 10. Each of the centering segments 12 has its distal end abutted against the wall sections 52. Since the centering segments 12 are resiliently biased towards the base section 26, the centering segments 12 thrust the wall sections 52 by their resiliency. Thus, under the elastic recoiling force of the centering segments 12, the centering ring 11 is moved to and halted at a position at which the resilient recoiling forces of the centering segments 12 are in equilibrium, that is a position at which the resilient recoiling forces of the centering segments 12 become equal to one an another. Meanwhile, since the supporting projections 29, the magnet 9 and the fitting member 4 are spaced apart from one another, there is no risk of obstruction of the movement of centering ring 11 under the resilient recoiling force of the centering segments 12.

The centering ring 11 is fixedly mounted on the fitting member 4 by being bonded to the lower surface of the table section 2 by UV resin or thermoplastic adhesive 32 at the position at which the resilient recoiling forces of the centering segments 12 counterbalance one another. For bonding the centering ring 11 to the table section 2 by the adhesive 32, the adhesive in a fluid state is dripped into the cut-outs 28 so that the adhesive 32 is in contact with both the centering ring 11 and the table section 2, the adhesive 12 being then allowed to be cured in situ. The adhesive 32 is cured by irradiation of UV rays by heating.

The table section 2 is then dismounted from the positioning jig 50 along with the centering ring 11. The centering segments 12 of the centering ring 11, thus mounted on the table section 2, are designed to produce outwardly directed resilient recoiling forces of equal magnitude when the segments are deflected as far as a circumference of a circle coaxial as the fitting hole 8 and having a diameter substantially equal to the diameter of the recording disc 101.

For setting and loading the recording disc 101 on the disc setting surface 3 of the disc table having the centering ring 11 formed of the spring plate material, the recording disc 101 is fitted on the fitting member 4 so that the rim of the center aperture 102 of the disc 101 is engaged with the fitting member 4, as shown by arrow C in FIG. 24.

When the recording disc 101 is moved towards the proximal side of the fitting member 4, the inner rim of the center aperture 102 is caused to bear against the centering segments 12, as shown in FIG. 25. The inner rim of the center aperture 102 is moved towards the proximal side of the fitting member 4, as it causes the centering segments 12 to be resiliently deformed and intruded into the cut-outs 10. At this time, each of the centering segments 12 is resiliently biased from the position at which it has its distal end abutted against the inner rim of the cut-out 10 to a position at which the centering segment has its distal end abutted against the center aperture 102 of the recording disc 101, as shown by arrow J in FIG. 25. On the other hand, the inner rim of the center aperture 102 is thrust outwards under the resilient restoring force of the centering segments 12.

When the recording disc 101 is fitted over the columnar section 4b of the fitting member 4 at the center aperture 102 thereof, with the portion of the recording disc 101 neighboring to the center aperture 102 being set on the disc setting surface 3, as shown in FIG. 25, the inner peripheral portion of the center aperture 102 is thrust against the centering segments 12 to effect a centering operation of aligning the center of the center aperture 102 with the axis of the fitting member 4.

At this time, the magnet 9 attracts the magnetic plate 104 mounted on the recording disc 101 for thrusting and supporting the recording disc 101 with respect to the disc setting surface 3.

When the recording disc 101 is loaded in position on the table section 2, and the driving shaft 1 is run in rotation by the spindle motor 5, the recording disc 101 is rotated in unison with the table section 2. The information signals are recorded on or reproduced from the signal recording layer of the recording disc 101 by the optical head device or the magnetic head device.

Meanwhile, for achieving optimum centering of the recording disc 101 by the centering segments 12 even after setting the disc 101 on the disc setting surface 3, it is necessary for the centering segments 12 to thrust the inner rim of the center aperture 102 of the recording disc 101 with a sufficient force. On the other hand, if an excess force is applied by the centering segments 12 against the inner rim of the center aperture 102, and an insufficient force of magnetic attraction is applied by the magnet 9 to the magnetic plate 104, the recording disc 101 cannot be moved to a position of abutment with respect to the disc setting surface 3. In this consideration, the spring constant $k_0$ of the centering segments 12 is selected to be not less than the minimum value $k_1$ of the spring constant capable of sufficiently correcting an offset of the recording disc 101 with respect to the fitting member 4 and not larger than the maximum value of the spring constant capable of shifting the recording disc 101 to the position of abutting the recording disc 101 against the disc setting surface 3 under the force of magnetic attraction by the magnet 9 of the magnetic plate 104.

It is now assumed that the spring constant of the centering segments 12 is k, the displacement of the centering segments 12 is $\Delta x$, the frictional coefficient between the centering segments 12 and the inner rim of the recording disc 101 is $\mu_1$ and the frictional coefficient between the recording disc 101 and the disc setting surface 3 is $\mu_2$. When the inner rim of the center aperture 102 is caused to bear against the centering segments 12, a force of magnetic attraction F exerted by the magnet 9 on the magnetic plate 104 as indicated by arrow F in FIG. 25 and a reactive force $k\Delta x$ exerted by the centering segment 12 on the inner rim of the center aperture 102 in a perpendicular direction act for each of the centering segment 12. It is assumed that the angle of tilt of the portion of the centering segment 12 abutted against the inner rim of the center aperture 102 of the recording disc 101 is indicated as an angle θ from the horizontal, as indicated by arrow θ in FIG. 25. Assuming that three centering segments 12 are provided, the formula $$F = \mu_1 k_2 \Delta x \sin\theta + k_2 \Delta x \cos\theta \tag{3}$$

holds for the maximum value $k_2$, so that $$k_2 = F/\{\Delta x(\mu_1 \sin\theta + \cos\theta)\} \tag{4}$$

and, since $k_0 < k_2$, the formula $$k_0 < F/\{\Delta x(\mu_1 \sin\theta + \cos\theta)\} \tag{5}$$

holds.

As for the minimum value $k_1$, if an offset of the recording disc 101 with respect to the fitting member 4 is indicated by D and a force of shifting the recording disc 101 towards the center position is indicated by C, the force C is given by $$C = 2k_1(\Delta x + D\cos 60°\sin\theta)\sin\theta\cos 60° - k_1(\Delta x - D\sin\theta)\sin\theta = (3/2)k_1 D\sin^2\theta \tag{6}$$

while a force of resistance R against the movement of the recording disc 101 is given by $$R = \mu_2(3F - k_1\Delta x\cos\theta) \tag{7}$$

In order for the recording disc 101 to be moved, it is necessary for the force of movement C to be larger than the force of resistance R. Consequently, from $$(3/2)k_1 D\sin^2\theta > \mu_2(3F - k_1\Delta x\cos\theta), \text{ the formula } k_1 = 6\mu_2 F/(3D\sin^2\theta + 2\mu_2\Delta x\cos\theta) \tag{8}$$

holds. Since $k_1 < k_0$, the formulas $$k_0 > 6\mu_2 F/(3D\sin^2\theta + 2\mu_2\Delta x\cos\theta) \tag{9}$$

holds.

It is observed that, since the centering segments 12 are formed of a metallic spring plate material, the spring constant of the centering segments 12 set in this manner may be substantially five times as large as the spring constant when the centering segments 12 are formed of a spring plate material of synthetic resin of the same thickness as that of the metallic spring plate material.

With the disc table, constituted with the centering ring 11 of the spring material, the recording disc 101 may be centered satisfactorily by the centering segments 12. Besides, since the distal ends of the centering segments 12 are caused to bear against the inner wall sections of the cut-outs 10, the thrusting force exerted on the inner rim of the center aperture 102 undergoes less fluctuations by an error possibly present in the spring constants. In addition, in the initial state in which the recording disc 101 is not loaded in position, the centering segments 12 are controlled in their positions by the inner wall sections of the cut-outs 10, so that the centering segments 12 may be positioned with great accuracy.

Besides, since the centering segments 12 are formed of a metallic material, they are excellent in creep resistance and exhibit superior durability under high temperature environment. Furthermore, these centering segments 12 may be fabricated with a precise spring constant as compared to the case wherein the segments 12 are fabricated from a synthetic resin.

Each centering segment 12 is provided with the tabs 31, 31, and has the portion abutted against the inner rim of the center aperture 102 of the recording disc 101 bent substantially arcuately towards the base section 26, so that it becomes possible to prevent a damage from being done to the inner rim of the center aperture 102 as well as to assure smooth movement of the recording disc 101 towards the disc setting surface 3.

A disc table of a seventh embodiment according to the present invention is explained.

Figure 26:
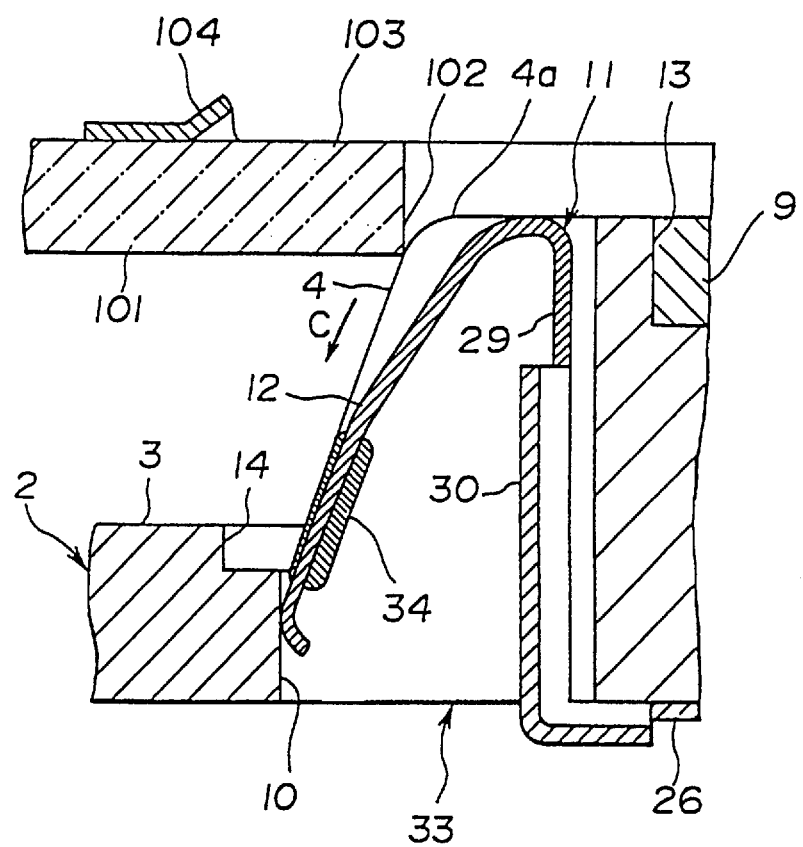
FIG. 26 is an enlarged longitudinal sectional view showing another modification of a disc table according to the present invention in which the disc member is constituted using a centering member of a spring plate formed of a metallic material.

When the disc table of the seventh embodiment according to the present invention is fabricated using the centering ring 11 of a spring material, as described above, the distal ends of the centering segments 12 may be provided with pads 34 of synthetic material, as shown in FIG. 26, instead of with the bent tabs 31, 31. These pads 34 may be provided on the centering segments 12 by a so-called outsert molding method. These pads 134 are provided at the portions of the centering segments 12 abutted against the inner rim of the centering aperture 102, so that, in the initial state in which the recording disc 101 is not loaded in position, the pads 134 are projected outwardly of the fitting member 4.

With the present disc table, it is similarly possible t to prevent damages from being inflicted by the centering segments 12 on the inner rim of the center aperture 102 of the recording disc 101, as well as to assure smooth movement of the recording disc 101 towards the disc setting surface 3.

What is claimed is:

1. A disc table for rotating a disc, comprising:
    a table section;
        a centrally located hub which is integral with said table section and which has a frusto-conical upper portion and a cylindrical lower portion, the cylindrical lower portion being rigid with said table section, and said frusto-conical upper portion merging directly with the cylindrical lower portion;
        a plurality of pivotal clamping members which are each supported on said hub so as to be pivotal about an axis which is tangential with respect to a circle having an axis about which said hub is rotatable, as a center, said clamping members each having first and second surfaces, the first surface being adapted to be engagable with the lower surface of said disc and the second surface being adapted to be engagable with the upper surface of said disc;
        a plurality of spring members each associated with one of said plurality of clamping members, said spring members being arranged to produce a toggle effect which allows said clamping members to be biased to a first angular position until rotated by a predetermined amount and then biased to a second angular position;
        said clamping members being responsive to said disc being placed on said hub in a manner wherein the lower surface of said disc engages the first surface of each said clamping members and in response to a bias force on said disc rotates said clamping members by the predetermined amount whereafter said spring members bias said clamping members to rotate toward their respective second angular positions and so that the second surfaces of said clamping members engage the upper surface of said disc and bias said disc down toward said table section with a force which is sufficient to deflect centering means inwardly with respect to said hub; and
        centering means including a plurality of tongue-shaped said centering segments which are integral with one another, which are equidistantly spaced about the hub, and which depend down from the top of said frusto-conical upper portion at an angle which is different from an angle of taper of said frusto-conical upper portion, said centering segments each having a free end which is located in a toridal recess formed in said table section about said lower portion of said hub, an essentially uniform cross section along a full length thereof, and an elasticity which is selected to allow said centering segments to be flexible and to flex inwardly in response to an engagement with the disc as the disc is biased down toward said table section.

2. A disc table as defined in claim 1, wherein the free end of each of said centering segments abuts a peripheral surface of the toridal recess in a stressed state, whereby said centering segments are not biased from an unstressed state and the spring constants of each centering segment can be relatively small.

3. A disc table as defined in claim 1, wherein each of the clamping members comprises a generally T-shaped body defining first, second, and third arms, a portion of the first arm defines the first surface, a portion of the second arm defines the second surface, and the third arm is pivotally mounted to the hub.

4. A disc table as defined in claim 3, wherein the hub includes a plurality of spaced mounting slits defined by side walls in the hub, each of said slits being associated with a respective one of said clamping members and the third arm of each clamping member being received within the slit and pivotally mounted to the hub by a supporting shaft extending between the side walls and through the third arm.

5. A disc table as defined in claim 4, wherein each of the spring members comprises a torsional coil spring having first and second terminal ends, and the first terminal end engages the third arm and the second terminal end engages the hub to apply a biasing force to the clamping member.

6. A disc table as defined in claim 5, wherein each of the first and second terminal ends of the torsional springs engage the associated third arm and hub, respectively, so that the torsional spring biases the second surface of the second arm onto the an upper surface of the disc to clamp the disc between the second arm and a disc setting surface, when the clamping members are in the second angular position.

7. A disc table as defined in claim 6, wherein each of the first and second terminal ends of the torsional springs engage the associated third arms and hubs, respectively, so that the torsional spring biases the first surface of the associated first arm onto a lower surface of the disc to support the disc above the disc setting surface, when the clamping members are in the first angular position.

* * * * *

UNITED STATES PATENT AND TRADEMARK OFFICE
CERTIFICATE OF CORRECTION

PATENT NO.   : 5,862,120  
DATED        : January 19, 1999  
INVENTOR(S)  : Hiroshi Mukawa It is certified that error appears in the above-identified patent and that said Letters Patent is hereby corrected as shown below:

<u>Title page,</u>
Item [62], should read:

-- Division of Serial No. 730,935, October 16, 1996, U.S. Patent No. 5,799,006, which is a continuation of Serial No. 391,461, Feb. 21, 1995, Patent No. 5,633,856, which is a continuation of Serial No. 5,159, January 15, 1993, abandoned. --

<u>Column 20,</u>
Line 45, should read -- A disc table as defined in claim 5, wherein each of the first and second terminal ends of the torsional springs engage the associated third arm and hub, respectively, so that the torsional spring biases the second surface of the second arm onto an upper surface of the disc to clamp the disc between the second arm and a disc setting surface, when the clamping members are in the second angular position. --

Signed and Sealed this

Sixth Day of May, 2003

JAMES E. ROGAN  
*Director of the United States Patent and Trademark Office*